US009047506B2

(12) United States Patent
Nishiguchi et al.

(10) Patent No.: US 9,047,506 B2
(45) Date of Patent: Jun. 2, 2015

(54) COMPUTER-READABLE RECORDING MEDIUM STORING AUTHENTICATION PROGRAM, AUTHENTICATION DEVICE, AND AUTHENTICATION METHOD

(71) Applicant: FUJITSU LIMITED, Kawasaki-shi, Kanagawa (JP)

(72) Inventors: Naoki Nishiguchi, Kawasaki (JP); Noboru Iwamatsu, Kawasaki (JP); Masahide Noda, Kawasaki (JP); Masatomo Yasaki, Kako (JP)

(73) Assignee: FUJITSU LIMITED, Kawasaki (JP)

( * ) Notice: Subject to any disclaimer, the term of this patent is extended or adjusted under 35 U.S.C. 154(b) by 182 days.

(21) Appl. No.: 13/630,086

(22) Filed: Sep. 28, 2012

(65) Prior Publication Data

US 2013/0136320 A1 May 30, 2013

(30) Foreign Application Priority Data

Nov. 25, 2011 (JP) ................................ 2011-257341

(51) Int. Cl.
*G06K 9/78* (2006.01)
*G06K 9/00* (2006.01)

(52) U.S. Cl.
CPC ................................ *G06K 9/00295* (2013.01)

(58) Field of Classification Search
None
See application file for complete search history.

(56) References Cited

U.S. PATENT DOCUMENTS

2005/0021618 A1 1/2005 Isozaki
2005/0219603 A1* 10/2005 Patton et al. ................ 358/1.14
2007/0189585 A1* 8/2007 Sukegawa et al. ........... 382/118

FOREIGN PATENT DOCUMENTS

JP 2003-162506 6/2003
JP 4522344 6/2006
JP 4581872 1/2007
JP 2007-102683 4/2007
JP 2008-182428 8/2008
JP 2008-271310 11/2008
JP 2011-009898 1/2011
JP 2011-9900 1/2011
WO WO 2009/101671 A1 8/2009

OTHER PUBLICATIONS

Japanese Office Action mailed Apr. 7, 2015 in corresponding Japanese Patent Application No. 2011-257341 (3 pages) (2 pages English Translation).

* cited by examiner

*Primary Examiner* — Bhavesh Mehta
*Assistant Examiner* — David F Dunphy
(74) *Attorney, Agent, or Firm* — Staas & Halsey LLP

(57) ABSTRACT

A computer-readable recording medium storing an authentication program for causing a computer to execute an authentication process, the authentication process includes: extracting a plurality of face information from an image acquired; when the plurality of face information include both first face information registered in authentication information and second face information not registered in the authentication information, registering the second face information in the authentication information; and if new face information extracted from new image is the second face information stored in the authentication information, determining that an authentication for the new face information is successful.

18 Claims, 30 Drawing Sheets

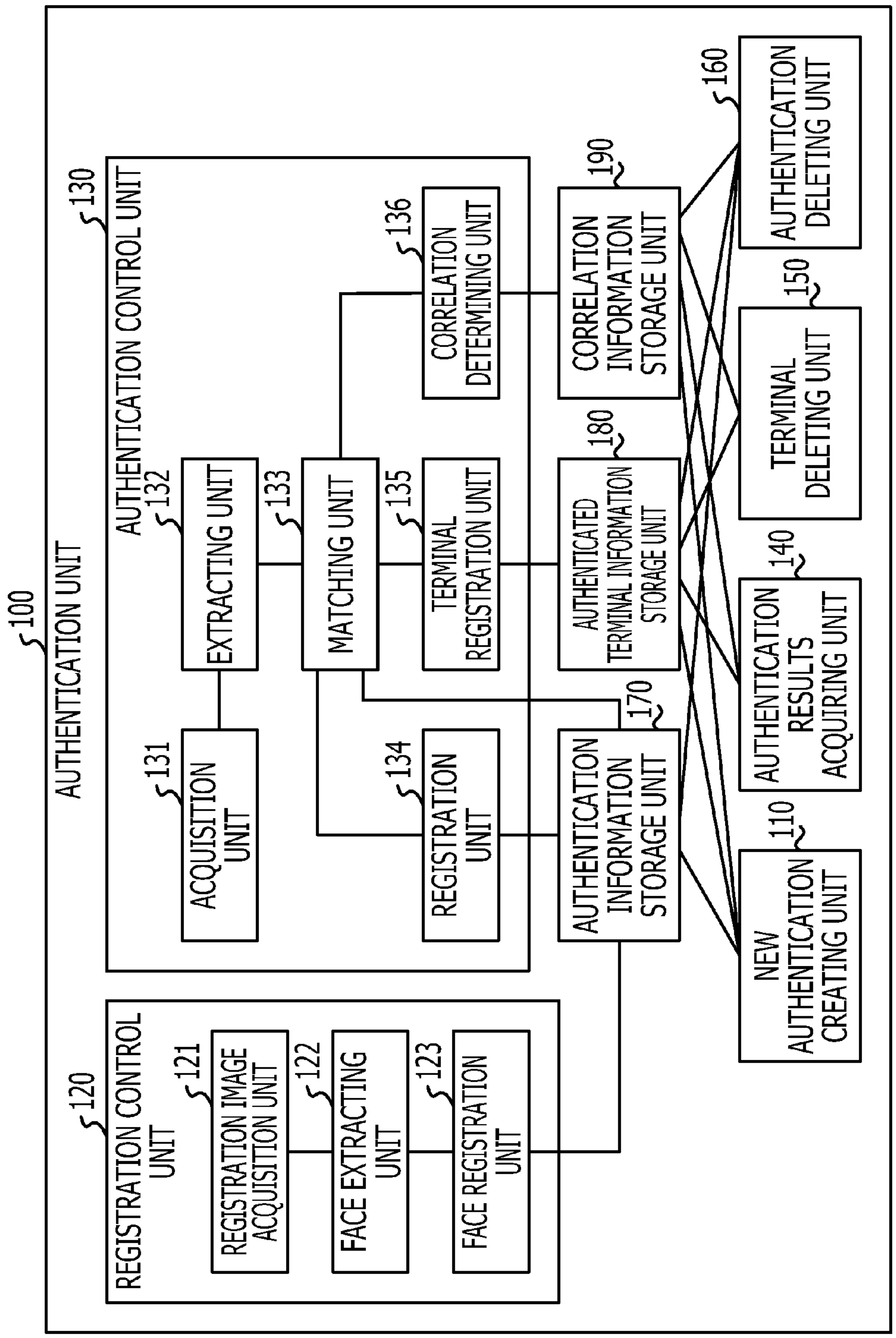
FIG. 2
100
AUTHENTICATION UNIT
130
AUTHENTICATION CONTROL UNIT
131
ACQUISITION UNIT
132
EXTRACTING UNIT
133
MATCHING UNIT
134
REGISTRATION UNIT
135
TERMINAL REGISTRATION UNIT
136
CORRELATION DETERMINING UNIT
120
REGISTRATION CONTROL UNIT
121
REGISTRATION IMAGE ACQUISITION UNIT
122
FACE EXTRACTING UNIT
123
FACE REGISTRATION UNIT
170
AUTHENTICATION INFORMATION STORAGE UNIT
180
AUTHENTICATED TERMINAL INFORMATION STORAGE UNIT
190
CORRELATION INFORMATION STORAGE UNIT
110
NEW AUTHENTICATION CREATING UNIT
140
AUTHENTICATION RESULTS ACQUIRING UNIT
150
TERMINAL DELETING UNIT
160
AUTHENTICATION DELETING UNIT

FIG. 5A

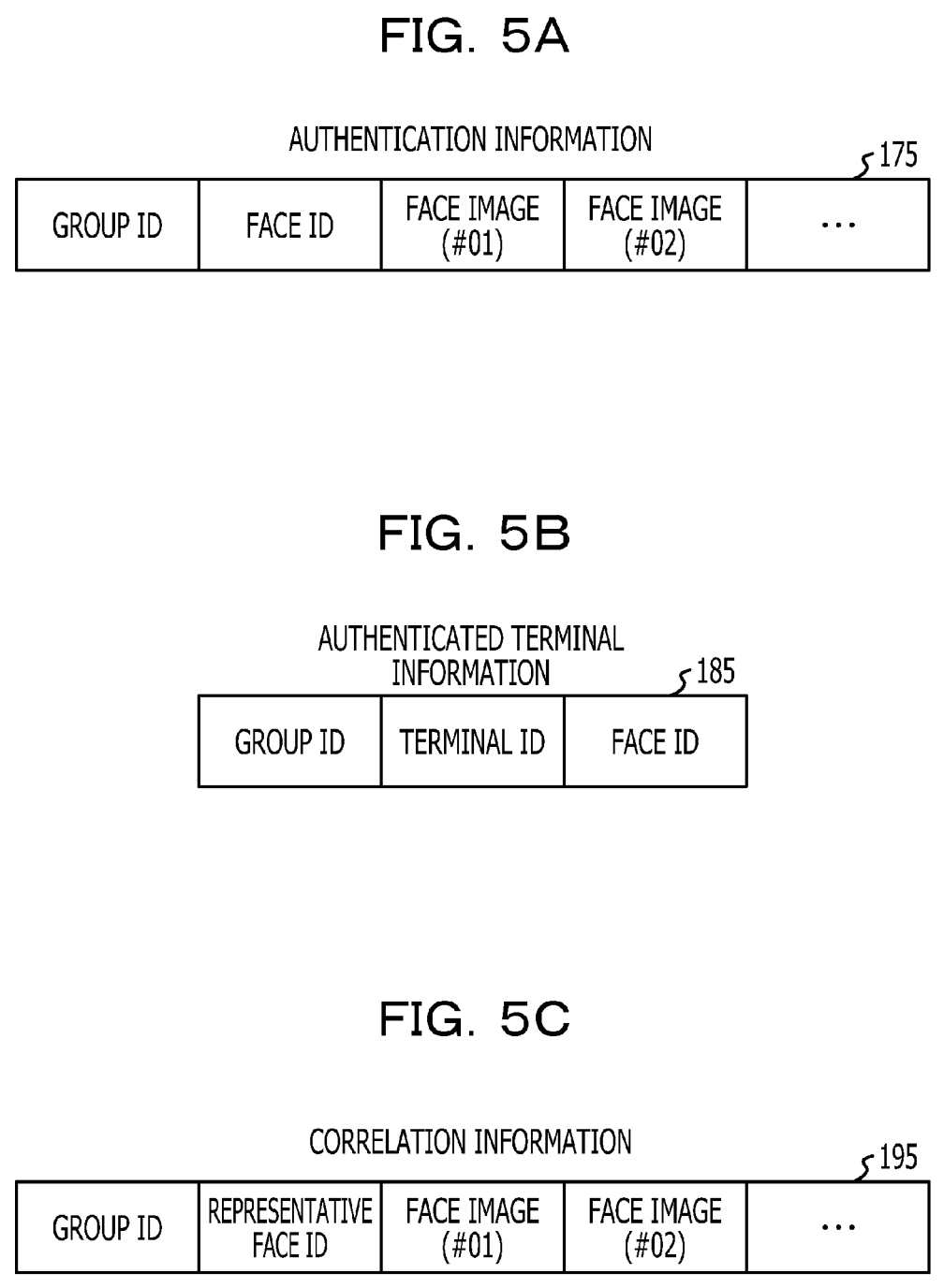

AUTHENTICATION INFORMATION

175

| GROUP ID | FACE ID | FACE IMAGE (#01) | FACE IMAGE (#02) | ... |
|---|---|---|---|---|

FIG. 5B

AUTHENTICATED TERMINAL INFORMATION

185

| GROUP ID | TERMINAL ID | FACE ID |
|---|---|---|

FIG. 5C

CORRELATION INFORMATION

195

| GROUP ID | REPRESENTATIVE FACE ID | FACE IMAGE (#01) | FACE IMAGE (#02) | ... |
|---|---|---|---|---|

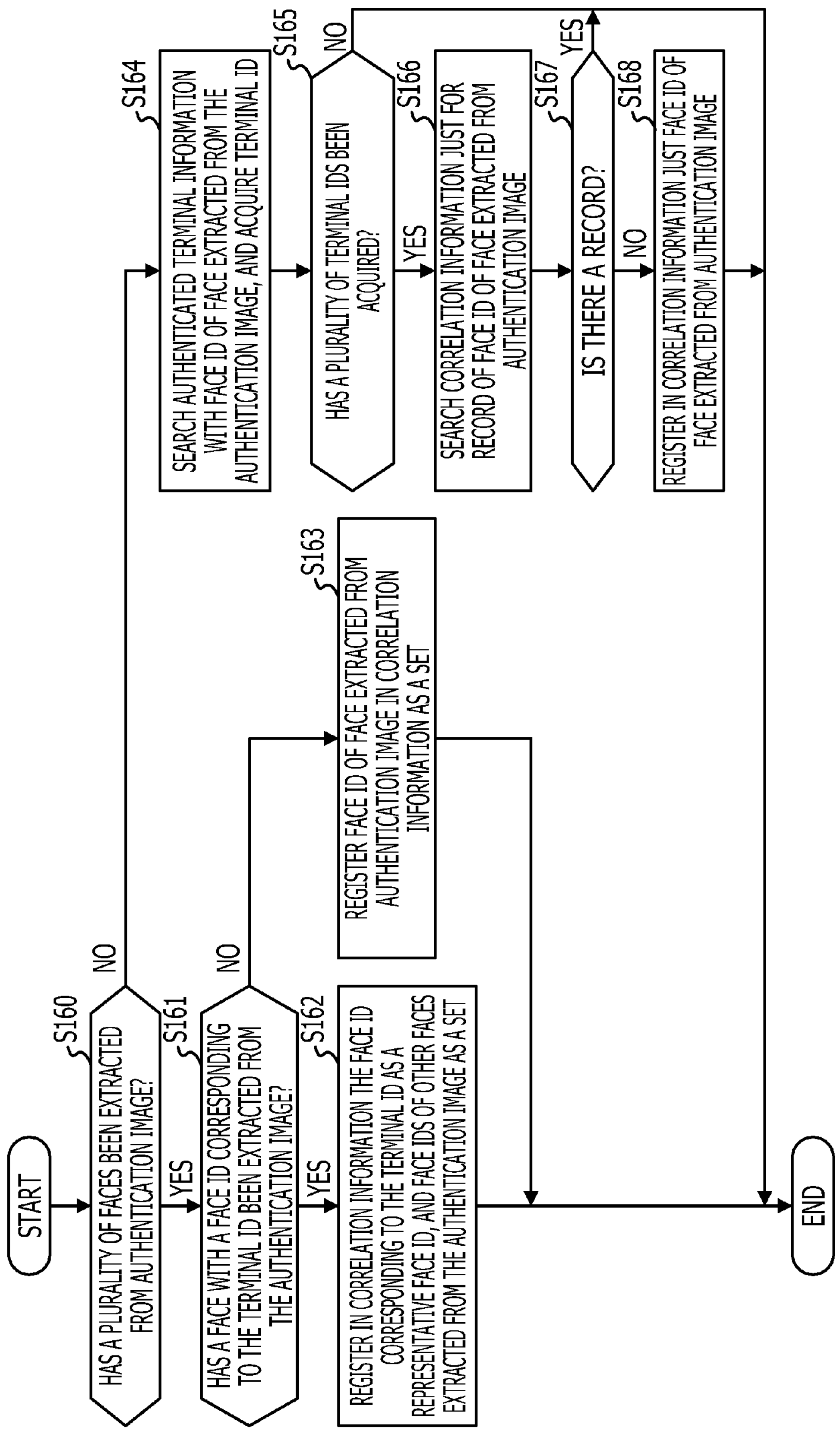
FIG. 14
START
S160
HAS A PLURALITY OF FACES BEEN EXTRACTED FROM AUTHENTICATION IMAGE?
YES
NO
S161
HAS A FACE WITH A FACE ID CORRESPONDING TO THE TERMINAL ID BEEN EXTRACTED FROM THE AUTHENTICATION IMAGE?
YES
NO
S162
REGISTER IN CORRELATION INFORMATION THE FACE ID CORRESPONDING TO THE TERMINAL ID AS A REPRESENTATIVE FACE ID, AND FACE IDS OF OTHER FACES EXTRACTED FROM THE AUTHENTICATION IMAGE AS A SET
S163
REGISTER FACE ID OF FACE EXTRACTED FROM AUTHENTICATION IMAGE IN CORRELATION INFORMATION AS A SET
S164
SEARCH AUTHENTICATED TERMINAL INFORMATION WITH FACE ID OF FACE EXTRACTED FROM THE AUTHENTICATION IMAGE, AND ACQUIRE TERMINAL ID
S165
HAS A PLURALITY OF TERMINAL IDS BEEN ACQUIRED?
YES
NO
S166
SEARCH CORRELATION INFORMATION JUST FOR RECORD OF FACE ID OF FACE EXTRACTED FROM AUTHENTICATION IMAGE
S167
IS THERE A RECORD?
YES
NO
S168
REGISTER IN CORRELATION INFORMATION JUST FACE ID OF FACE EXTRACTED FROM AUTHENTICATION IMAGE
END

FIG. 20

AUTHENTICATION INFORMATION
(GROUP ID = G1)

175a

| FACE ID | FACE IMAGE (#01) | FACE IMAGE (#02) | FACE IMAGE (#03) |
|---|---|---|---|
| Fa | | ′ | ″ |
| Fb | | ′ | ″ |
| Fc | | ′ | – |
| Fd | | ′ | – |

FIG. 21

AUTHENTICATED TERMINAL INFORMATION (GROUP ID = G1)

185a

| TERMINAL ID | FACE ID |
|---|---|
| Tb | Fb |
| Tc | Fc |
| Ta | Fa |
| Td | Fd |

FIG. 22

CORRELATION INFORMATION
(GROUP ID = G1)

195a

| REPRESENTATIVE FACE ID | FACE ID (#01) | FACE ID (#02) | FACE ID (#03) |
|---|---|---|---|
| 0 | Fa | Fb | Fc |
| – | Fa | Fb | – |
| Fc | Fd | – | – |

USER h
20d
(TERMINAL ID = Th)
(4)
USER g
20g
(3)
(TERMINAL ID = Tg)
(0)
USER f
20f
(2)
(TERMINAL ID = Tf)
USER e
20e
(1)
(TERMINAL ID = Te)
10
USER x

FIG. 25

AUTHENTICATION INFORMATION (GROUP ID = G2)

175b

| FACE ID | FACE IMAGE (#01) | FACE IMAGE (#02) | FACE IMAGE (#03) |
|---|---|---|---|
| Fe | | ′ | ″ |
| Ff | | ′ | – |
| Fg | | ′ | ″ |

FIG. 26

AUTHENTICATED TERMINAL INFORMATION (GROUP ID = G2)

185b

| TERMINAL ID | FACE ID |
|---|---|
| Te | Fe |
| Tf | Ff |
| Tg | Fg |
| Th | Fg |

FIG. 27

CORRELATION INFORMATION
(GROUP ID = G2)

195b

| REPRESENTATIVE FACE ID | FACE ID (#01) | FACE ID (#02) | FACE ID (#03) |
|---|---|---|---|
| 0 | Fe | Ff | Fg |
| Ff | Fe | – | – |
| – | Fg | – | – |

FIG. 28A
CORRELATION INFORMATION 195
| REPRESENTATIVE FACE ID | FACE ID (#01) | FACE ID (#02) |
|---|---|---|
| 0 | 1 | 2 |
| 1 | 3 | 4 |
| 2 | 5 | 6 |
| 2 | 7 | – |
FIG. 28B
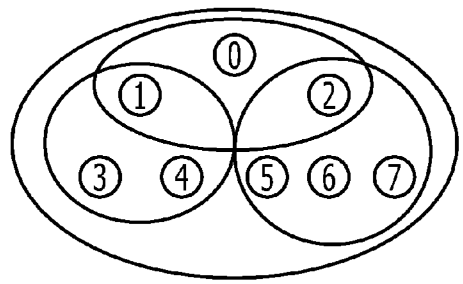
FIG. 28C
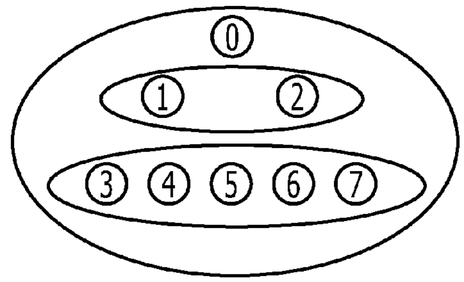
FIG. 28D
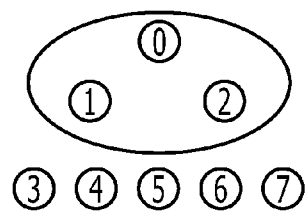
③ ④ ⑤ ⑥ ⑦

COMPUTER-READABLE RECORDING MEDIUM STORING AUTHENTICATION PROGRAM, AUTHENTICATION DEVICE, AND AUTHENTICATION METHOD

CROSS-REFERENCE TO RELATED APPLICATION

This application is based upon and claims the benefit of priority of the prior Japanese Patent Application No. 2011-257341, filed on Nov. 25, 2011, the entire contents of which are incorporated herein by reference.

FIELD

The technology disclosed in the embodiments relates to the technology of facial recognition.

BACKGROUND

There is the technology of facial recognition in which face information is used to perform authentication. With facial recognition, a device which executes authentication matches face information registered beforehand with face information extracted from an image sent from a terminal regarding which authentication is to be received, for example. In the event that determination is made that both face information are information of the same face, determination is made by the device that authentication of this terminal has been successful.

Japanese Laid-open Patent Publication No. 2003-162506, Japanese Laid-open Patent Publication No. 2008-271310, Japanese Laid-open Patent Publication No. 2007-102683, Japanese Patent No. 4,581,872, Japanese Laid-open Patent Publication No. 2008-182428, Japanese Laid-open Patent Publication No. 2011-9898, Japanese Laid-open Patent Publication No. 2011-9900, and Japanese Patent No. 4,522,344, for example, disclose technology relating to facial recognition.

As one example, there is known a technology in which a user is identified by comparing and matching personal information read out from face image information and personal information presented by the user. Also, there is known a technology in which faces are detected from an image, the detected faces are grouped, and identification of individuals is performed for each group.

Further, there is known a technology in which an individual is identified from a face included in an imaged image, and an imaged image is transmitted to an email address of the identified individual. Also, there is known a technology in which authentication of a face ID received from a communication terminal is performed using a face ID created based on a face extracted from a shot image, and a shot image is transmitted to the communication terminal in the event that authentication is successful.

There is known a technology in which terminals at a same position over a predetermined amount of time are grouped, and data of an image shot at a certain terminal is transmitted to terminals belonging to the same group. Also, there is known a technology in which face information within the image is matched with facial recognition information of an owner of a reception device which has transmitted an ID the same as an ID which that image has, and an image is distributed to the reception device in the event of matching.

There is known a technology of an imaging apparatus in which airwave output intensity is controlled in accordance with distance as to an image subject, and in the event that determination is made from comparison between face information received from a reception device which as received the airwaves and the face of a subject within imaged image data that there are the same individual, image data is transmitted to the reception device. Also, there is known a technology in which an imaging device obtains face information obtained from a terminal within a network and information of a distribution destination correlated with that face information, and in the event that a face corresponding to the face information is included in an image, that image is transmitted to a distribution destination corresponding to the face information.

SUMMARY

According to an aspect of the invention, a computer-readable recording medium storing an authentication program for causing a computer to execute an authentication process, the authentication process includes: extracting a plurality of face information from an image acquired; when the plurality of face information include both first face information registered in authentication information and second face information not registered in the authentication information, registering the second face information in the authentication information; and if new face information extracted from new image is the second face information stored in the authentication information, determining that an authentication for the new face information is successful.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating a configuration example of an authentication unit according to the embodiment;

FIGS. 5A through 5C are diagrams illustrating a data configuration example of various types of information according to the embodiment;

FIG. 14 is a flowchart of correlation processing by a correlation determining unit according to the embodiment;

FIG. 20 is a diagram illustrating an example of authentication information according to the first embodiment;

FIG. 21 is a diagram illustrating an example of authenticated terminal information according to the first embodiment;

FIG. 22 is a diagram illustrating an example of correlation information according to the first embodiment;

FIG. 25 is a diagram illustrating an example of authentication information according to the second embodiment;

FIG. 26 is a diagram illustrating an example of authenticated terminal information according to the second embodiment;

FIG. 27 is a diagram illustrating an example of correlation information according to the second embodiment;

FIGS. 28A through 28D are diagrams illustrating examples of group management using correlation information according to the embodiment:

DESCRIPTION OF EMBODIMENTS

Figure 1:
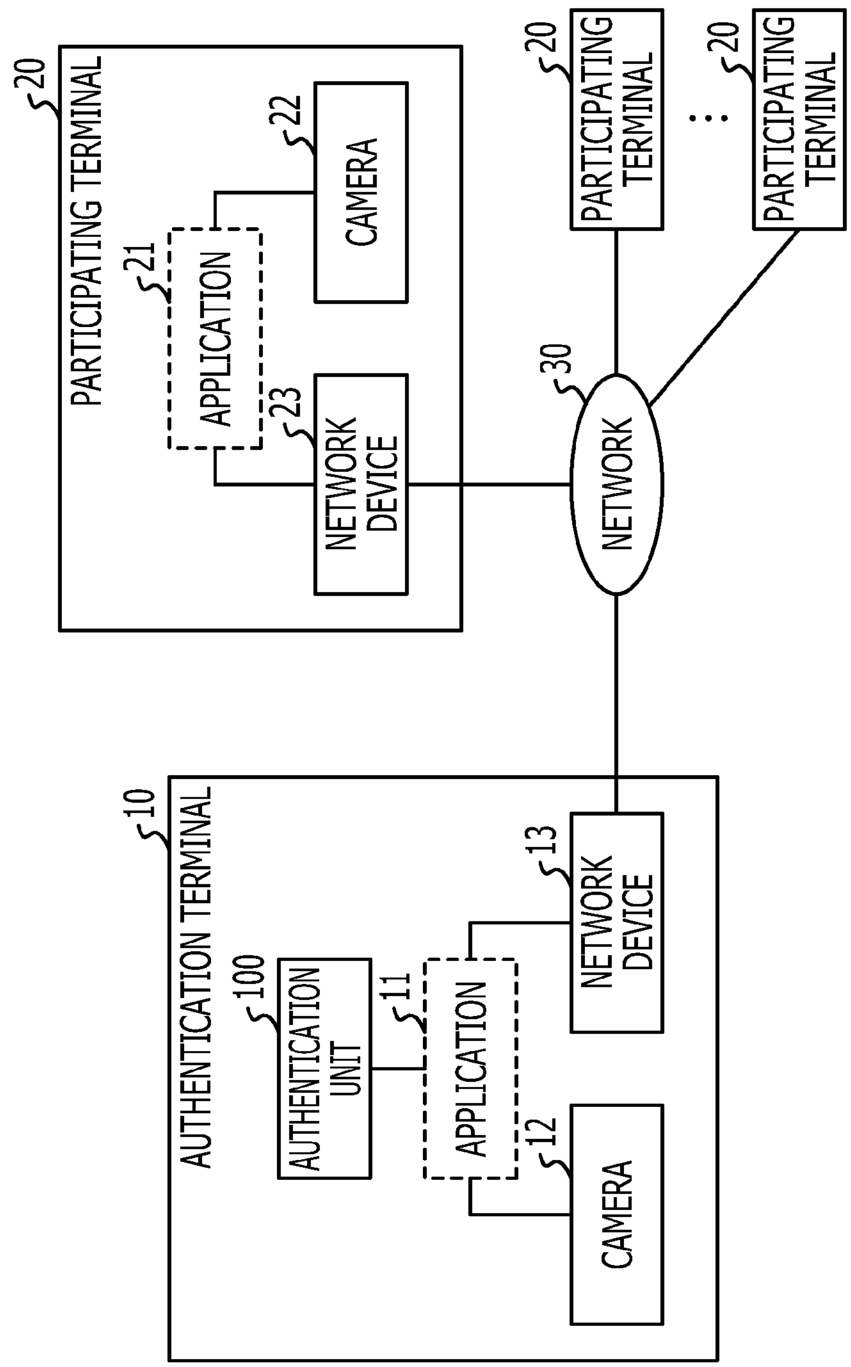
FIG. 1 is a diagram illustrating a configuration example of a computer system according to an embodiment.

In order to perform facial recognition, face information to be used for authentication has to be registered beforehand in a device which is to perform the authentication. Generally, registration of face information to be used for authentication is performed by a particular terminal or the like which the user operates and which has authority to register face information, taking into consideration the issue of securing the reliability of authentication. For example, a user having authority for face information registration uses a camera belonging to a particular terminal to image the face of the user of the terminal which is to be authenticated. The particular terminal extracts the face information of the user from the image that is obtained, and performs registration of face information.

Now, there are cases where additional registration of face information of a user operating the terminal which is to be authenticated is desired. An arrangement where the task of registration of face information of each individual user is performed each time there is such a desire to additionally register face information would place a great burden on the user having the authority of face information registration. On the other hand, automating the processing of performing additional registration of face information upon accepting face information from any terminal in order to ease the burden on the user having the authority of face information registration would make it difficult to maintain reliability of authentication.

It has been found desirable to provide technology which facilitates additional registration of face information to be used for authentication.

In this age where almost everyone has a terminal such as a cellular phone or the like, there are more and more opportunities where a user of a terminal would let others see the screen. In such a case, multiple users would not be watching a single terminal for a long time. What is performed instead is to turn the screen of the terminal toward another person, or send an image thereof by email, or store the image in a server and inform the other person of the location where the image is stored by email or the like, so as to share the screen. In such a situation, there is demand for technology allowing multiple terminals to be easily grouped, so as to easily share a screen of a certain terminal, for example, with other terminals.

For example, as an arrangement where multiple terminals are authenticated to group the terminals, let us assume technology where a camera of a terminal which is to provide information to be shared is used to shoot faces of users of terminals to receive that information, the images thereof are registered, and facial recognition is performed at the terminal providing the information. A user of a terminal to receive the information then shoots his/her own face with the camera of his/her own terminal, and commissions authentication by sending the image to the terminal providing the information. In the event that the received face is included in the registered faces, the terminal providing information determines the authentication to be successful, and permits the terminal to receive this information to access the information. Using this technology enables terminals of users which the user of the terminal to provide the information has permitted to be easily grouped, and information to be provided.

However, with this technology, in the event of newly adding, to a group which has already been formed, a terminal to receive information, the face of the user operating the terminal to be newly added has to be shot at the terminal to provide the information and the face information has to be registered, each time such a new addition is made. The burden of registering the face information of each newly-added terminal user on the user of the terminal providing the information is great. Also, there may be cases where a user who wants to participate in the group afterwards does not know whose terminal is providing the information, and accordingly who in the group he/she may approach. Further, even if the user of the terminal providing information is found out, that individual may be too busy to take a picture.

The following is a description of technology according to an embodiment, facilitating additional registration of face information to be used for authentication, with reference to the drawings.

FIG. 1 is a diagram illustrating a configuration example of a computer system according to an embodiment.

With the computer system illustrated in FIG. 1, an authentication terminal 10 is an information processing device which groups terminals with each other to share information. The authentication terminal 10 uses a face image of the user which is sent from a participating terminal 20 desiring to participate in the group, to perform authentication of the participating terminal 20. Each participating terminal 20 is an information processing device participating in a group sharing information. The participating terminal 20 sends a face image of the user to the authentication terminal 10, and commissions the authentication terminal 10 to perform authentication such that the participating terminal 20 may receive permission to participate in the group. Examples of the authentication terminal 10 and participating terminals 20 include information processing devices such as PCs (personal computers), cellular telephones, slate terminals, and so forth.

The authentication terminal 10 and participating terminals 20 are communicably connected via a network 30 such as 3G (3rd Generation), wireless LAN (Local Area Network), Bluetooth (a registered trademark) or the like, for example.

The authentication terminal 10 has a camera 12, a network device 13, and an authentication unit 100. Further, the authentication terminal 10 stores an application 11. With the computer system illustrated in FIG. 1, an application 11 at the authentication terminal 10 side runs on the authentication terminal 10. The application 11 is an application which provides information to be shared between multiple terminals that have been grouped. The network device 13 is a device performs communication with external information processing devices. The authentication unit 100 performs authentication of the participating terminals 20 using user faces. The authentication unit 100 illustrated in FIG. 1 is a module which can be used by multiple applications running on the authentication terminal 10, for example.

The participating terminal 20 has a camera 22 and a network device 23. The participating terminal 20 stores an application 21. With the computer system illustrated in FIG. 1, the application 21 at the participating terminal 20 side runs on the participating terminal 20. The application 21 is an application which cooperatively works with the application 11 at the authentication terminal 10 side, obtaining information provided from the authentication terminal 10 side. The network device 23 is a device which communicates with external information processing devices.

Upon the authentication terminal 10 and participating terminals 20 being grouped, connection between the terminals is established by the application 11 and application 21. Subsequently, the terminals execute the application 11 and application 21 to perform processing cooperatively while communicating with each other. Note that conceivable examples of the application 11 and application 21 may include an application to display the screen of the authentication terminal 10 at the participating terminals 20, an application enabling the participating terminals 20 to access a folder at the authentication terminal 10, and so forth.

FIG. 2 is a diagram illustrating a configuration example of the authentication unit according to the embodiment.

The authentication unit 100 according to the embodiment illustrated in FIG. 2 performs authentication of participating terminals 20 by facial recognition using faces of people. The authentication unit 100 includes a new authentication creating unit 110, a registration control unit 120, an authentication control unit 130, an authentication results acquiring unit 140, a terminal deleting unit 150, an authentication deleting unit 160, an authentication information storage unit 170, an authenticated terminal information storage unit 180, and a related information storage unit 190.

The authentication information storage unit 170 is a storage unit which stores authentication information. Information of a face used for facial recognition is registered in authentication information. Information of a face used for facial recognition includes images of a face, facial features converted into numbers, and so forth. Note that with this embodiment, images of a face will be used as information of the face. That is to say, face image data to be used for facial recognition is registered in the authentication information according to this embodiment.

The authenticated terminal information storage unit 180 is a storage unit storing authenticated terminal information. Recorded in the authenticated terminal information is information of participating terminals 20 regarding which authentication has been successful.

The correlation information storage unit 190 is a storage unit storing correlation information. Registered in the correlation information is information correlating multiple faces with each other.

The new authentication creating unit 110 performs preprocessing at the time of starting authentication for a new group, such as issuing new group IDs, creating various types of information for the new group, and so forth. A group ID is identification information for identifying the group of terminals sharing information.

The registration control unit 120 registers information of faces to be used for facial recognition, in the authentication information stored in the authentication information storage unit 170. The registration control unit 120 includes a registration image acquisition unit 121, a face extracting unit 122, and a face registration unit 123.

The registration image acquisition unit 121 acquires an image including the face of a person to be registered. Hereinafter, an image including the face of a person to be registered will be referred to as "registration image". A registration image is not an image obtained from any terminal, but rather an image obtained from a certain terminal which is operated by a user having authority. With the embodiment, the registration image acquisition unit 121 acquires a registration image obtained by shooting with the camera 12 of the authentication terminal 10, from the application 11.

The face extracting unit 122 extracts the face of a person from the registration image. Various techniques for extracting faces of people from images, such as a technique for extracting a region of human face skin color and so forth, are widely known, so description thereof will be omitted here. The face extracting unit 122 here extracts a region of the face of a person from the registration image, thereby obtaining a face image.

The face registration unit 123 registers the image of the face that has been extracted from the registration image in the authentication information storage unit 170.

The authentication control unit 130 executes facial recognition. With the embodiment, the authentication control unit 130 performs authentication of participating terminals 20 in accordance with an authentication commission from the application 11. The authentication control unit 130 includes an acquisition unit 131, an extracting unit 132, a matching unit 133, a registration unit 134, a terminal registration unit 135, and a correlation determining unit 136.

The acquisition unit 131 acquires an image. With the embodiment, the image acquired by the acquisition unit 131 is an image regarding which authentication is to be performed, that has been output from the participating terminal 20 commissioning the authentication. Hereinafter, an image regarding which authentication is to be performed will be referred to as an "authentication image". With the embodiment, the acquisition unit 131 acquires an authentication image acquired by shooting with the camera 22 of the participating terminal 20, from the application 11.

The extracting unit 132 extracts a face from the acquired image. As described above, various techniques are known for extracting faces of people from images, so description will be omitted here. The extracting unit 132 here extracts a region of the face of a person from the authentication image, thereby acquired a face image.

The matching unit 133 matches the information of the face extracted from the acquired image with the information of faces registered in the authentication information storage unit 170, and determines whether or not the face extracted for the acquired image is a face registered in the information in the authentication information storage unit 170. Various techniques are known as techniques for determining whether or not information of two faces to be matched is the same information, based on the similarity of the two faces, so description thereof will be omitted. With the embodiment, an image matching technique or the like is used, for example, to match the face image acquired from the authentication image and the face images registered in the authentication information storage unit 170, thereby determining whether or not the two images are images including the same face.

In the event that a face regarding which determination is made that the face is a face of which information has been registered in the authentication information storage unit 170, and a face regarding which determination is made that the face is not a face of which information has been registered in the authentication information storage unit 170, are extracted from the acquired image, the registration unit 134 registers, in the authentication information storage unit 170, the information of the face regarding which determination has been made that the face is a face of which information has not been registered in the authentication information storage unit 170. With the embodiment, for example, in the event that a face of which a face image is registered in the authentication information storage unit 170 and an unregistered face are extracted from a single authentication image, the registration unit 134 extracts the image of the unregistered face from the authentication image and additionally registers to the authentication information storage unit 170.

Thus, with the authentication unit 100 according to the embodiment, in the event that a registered face and unregistered face are extracted form an authentication image which an external participating terminal 20 has sent, the image of the unregistered face is additionally registered in the authentication information storage unit 170 as information of a face to be used for authentication. This arrangement allows information of a face to be used for facial recognition to be additionally registered from images shot with terminals other than the authentication terminal 10 as well. At this time, the processing of additionally registration is automatically performed, so the user of the authentication terminal 10 does not have to go to any trouble. Also, this processing is performed upon the condition that a registered face is extracted from the image along with the face to be additionally registered, so a certain level of reliability of authentication or higher is secured.

In the event that a face regarding which determination has been made as being a face of which information is registered in the authentication information storage unit 170 has been extracted from the image output from the participating terminal 20 commissioning the authentication, the terminal registration unit 135 registers the information of the participating terminal 20 commissioning the authentication in the authenticated terminal information. For example, in the event that a face of which a face image has been registered in the authentication information storage unit 170 has been extracted from an authentication image, the terminal registration unit 135 determines that the participating terminal 20 which has output the authentication image has been successfully authenticated, and registers the information of that participating terminal 20 in the authenticated terminal information storage unit 180. With the embodiment, information of a participating terminal 20 being registered in the authenticated terminal information storage unit 180 indicates that authentication of that participating terminal 20 has been successful.

In the event that multiple faces are extracted from an acquired image, the correlation determining unit 136 records information correlating the multiple extracted faces with each other in the correlation information storage unit 190.

The authentication results acquiring unit 140 acquires the authentication results of a specified participating terminal 20. With the embodiment, in the event that the specified participating terminal 20 has been authenticated, the authentication results acquiring unit 140 also acquires the correlation information stored in the correlation information storage unit 190, and sends this to the application 11.

With regard to a participating terminal 20 of which connection with the authentication terminal 10 is to be ended, the terminal deleting unit 150 deletes information from the authenticated terminal information stored in the authenticated terminal information storage unit 180, and cancels the authentication.

With regard to a group of which authentication is to be ended, the authentication deleting unit 160 deletes the various types of information of this group, and dissolves the group.

Figure 3:
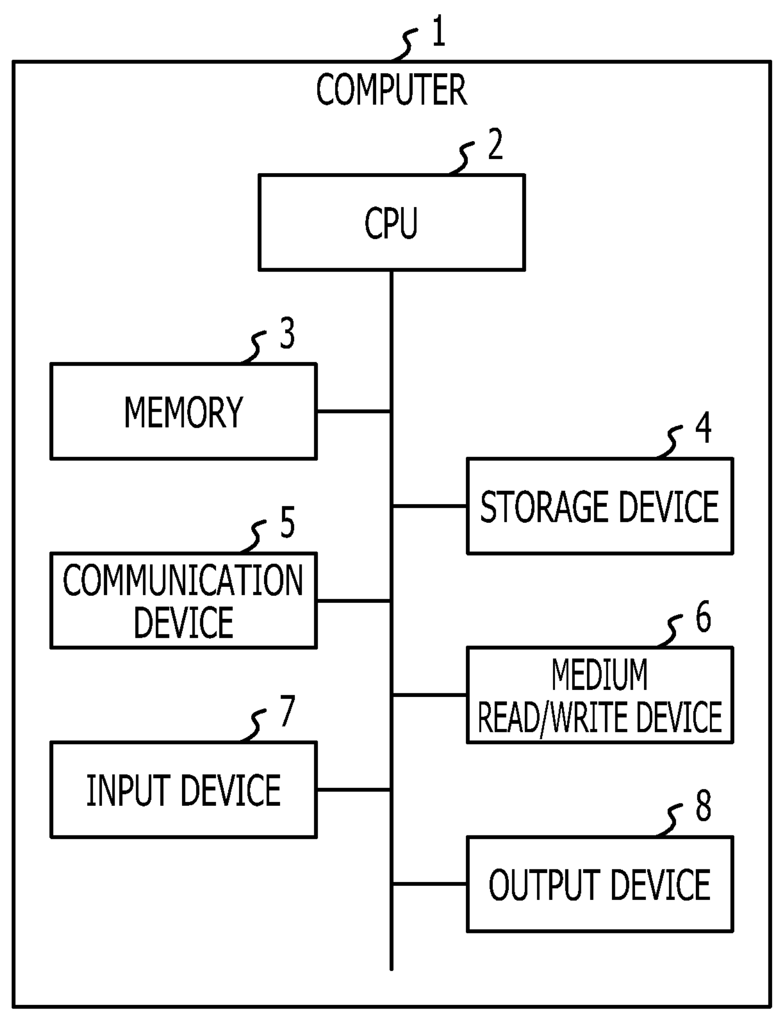
FIG. 3 is a diagram illustrating a hardware configuration example of a computer which realizes a terminal according to the embodiment.

FIG. 3 is a diagram illustrating a hardware configuration example of a computer which carries out the terminal according to the embodiment.

A computer 1 carrying out the authentication terminal 10 and participating terminals 20 according to the embodiment illustrated in FIG. 1 includes, for example, a CPU (Central Processing Unit) 2, memory 3 serving as main storage, a storage device 4, a communication device 5, a medium read/write device 6, an input device 7, an output device 8, and so forth. The storage device 4 is an external storage device such as an HDD (Hard Disk Drive) for example, or an auxiliary storage device or the like. The network devices 13 and 23 are included in the communication device 5. The medium read/write device 6 is a CD-R (Compact Disc Recordable) drive or DVD-R (Digital Versatile Disc Recordable) drive or the like, for example. The input device 7 is a keyboard, mouse, or the like, for example. The output device 8 is a display device such as a display, for example.

For example, the authentication unit 100 of the authentication terminal 10 illustrated in FIG. 1 and the functional units which the authentication unit 100 has can be realized by the hardware of the computer 1 such as the CPU 2 and memory 3 and so forth, and a software program. Programs which can be executed by the computer 1 are stored in the storage device 4, read out to the memory 3 at the time of being executed, and are executed by the CPU 2.

The computer 1 can directly read programs from a transportable recording medium and execute processing following the programs. Also, the computer 1 can execute programs that have been received each time a program is transferred from a server computer. Further, the program can be stored from a computer-readable recording medium that is readable by the computer 1.

Figure 4:
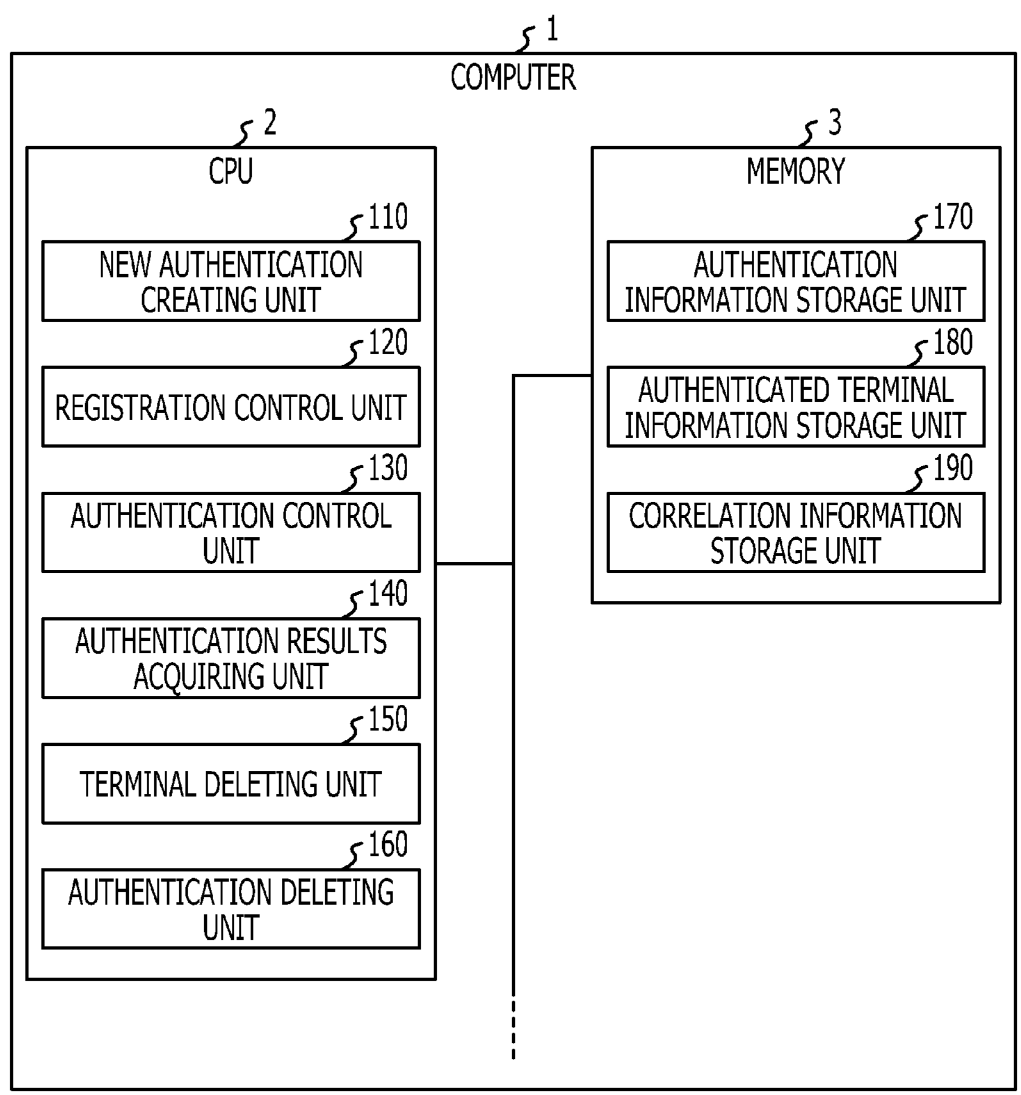
FIG. 4 is a diagram illustrating an example of realizing with a computer each functional part which the authentication unit according to the embodiment has.

FIG. 4 is a diagram illustrating an example of realizing the functionally units which the authentication unit according to the embodiment has, with a computer.

As illustrated in FIG. 4, for example, the new authentication creating unit 110, registration control unit 120, authentication control unit 130, authentication results acquiring unit 140, terminal deleting unit 150, and authentication deleting unit 160, which the authentication unit 100 has, can be realized by the CPU 2 and so forth of the computer 1. Also, for example, the authentication information storage unit 170, authenticated terminal information storage unit 180, and correlation information storage unit 190, which the authentication unit 100 has, can be realized by the memory 3 and so forth of the computer 1.

FIGS. 5A through 5C are diagrams illustrating data configuration examples of various types of information according to the embodiment.

FIG. 5A illustrates an example of data configuration of authentication information 175 stored in the authentication information storage unit 170. The authentication information 175 is information in which is a registered face image to be matched with an image of a face extracted from an authentication image sent from a participating terminal 20 for authentication. The authentication information 175 illustrated in FIG. 5A has information of a group ID, a face ID, and face images (#01, #02, . . . ).

The group ID is identification information of the group, indicating which group the authentication information 175 is about. The face ID is identification information identifying faces of people. A face image is an image of the face of a person, to be used for matching of an image of a face extracted from an authentication image at the time of authentication. With the embodiment, we will say that face ID "0" is defined as a special face ID corresponding to the user of the authentication terminal 10, and other than "0" is used for face IDs to be assigned to faces regarding which face images are registered.

Note that with the authentication information 175 illustrated in FIG. 5A, multiple face images can be registered as to a single face ID. With the embodiment, face images registered correlated to the same face ID are all face images which have been determined to be of the same face. For example, at the time of registering face images and at the time of authentication, multiple face images are registered as to a single face ID regarding face images which have been determined to be the same face as a face image that has already been registered. With the authentication information 175 the face image to be correlated to one face ID may be restricted to being one.

At the time of authentication, the matching unit 133 matches, for each face ID, all face images registered in the authentication information 175 in correlation with that face ID, and performs matching of the face image acquired from the authentication image. Design such as authentication being determined as being successful in the event that one of the multiple face images correlated with the same face ID matches, authentication being determined as being successful in the event that all of the multiple face images correlated with the same face ID match, and so forth, is optional. In the case of the former, the rate of success of authentication increases, and authentication efficiency improves. In the case of the latter, the precision of authentication increases, and the reliability of authentication improves.

FIG. 5B illustrates an example of data configuration of authenticated terminal information 185 stored in the authenticated terminal information storage unit 180. The authenticated terminal information 185 is information managing the participating terminals 20 regarding which authentication has been successful. The authenticated terminal information 185 illustrated in FIG. 5B has the information of group ID, terminal ID, and face ID.

The group ID is identification information of the group, indicating which group the authenticated terminal information 185 is about. The terminal ID is identification information uniquely identifying the participating terminals 20. Examples of a terminal ID that can be used include information such as a MAC (Media Access Control) address, email address, phone number, or the like. The face ID is identification information identifying faces of people.

With the embodiment, in the event that a face of which a face image has been registered in the authentication information 175 is extracted from an authentication image, the terminal registration unit 135 correlates the face ID of that face with the terminal ID of the participating terminal 20 which output the authentication image, and records in the authenticated terminal information 185. The participating terminal 20 of which the terminal ID has been recorded in the authenticated terminal information 185 is a participating terminal 20 of which facial recognition by the authentication unit 100 according to the embodiment has been successful.

FIG. 5C illustrates an example of data configuration of correlation information 195 stored in the correlation information storage unit 190. The correlation information 195 is information managing correlation of user faces with each other. The correlation information 195 illustrated in FIG. 5C has information of a group ID, a representative face ID, and face IDs (#01, #02, . . . ).

The group ID is identification information of the group, indicating which group the correlation information 195 is about. The representative face ID is a face ID of a face which is to be representative in correlation of faces with each other. A face ID is a face ID of a face to be correlated.

In the event that multiple faces are extracted from an authentication image, the correlation determining unit 136 correlates the multiple face IDs corresponding to the multiple faces, and records in the correlation information 195. The face ID corresponding to the face extracted from the authentication image is either the face ID corresponding to the face image in the authentication information 175 which is deemed to be the same face at the time of matching, or a newly-issued face ID in the event that there is no face image of the same face in the authentication information 175.

The representative face ID is a face ID correlated with the terminal ID of the participating terminal 20 which has output the authentication image from which the correlation between the multiple faces has been obtained. That is to say, the representative face ID is considered to be a face ID of the face of the user which has performed the correlation of the multiple faces that have been extracted from the authentication image. Also, in the event that no face ID has been correlated with the terminal ID of the participating terminal 20 which has output the authentication image, i.e., in the event that the participating terminal 20 which has output the authentication image has not yet succeeded in authentication, there is no representative face ID.

Note that with the embodiment, face ID "0" indicates a special face ID corresponding to the user of the authentication terminal 10. At the time of the registration control unit 120 registering in the correlation information 195 the face ID of a face extracted from an authentication image obtained by shooting with the camera 12 of the authentication terminal 10, the representative face ID of that record is "0".

Figure 6:
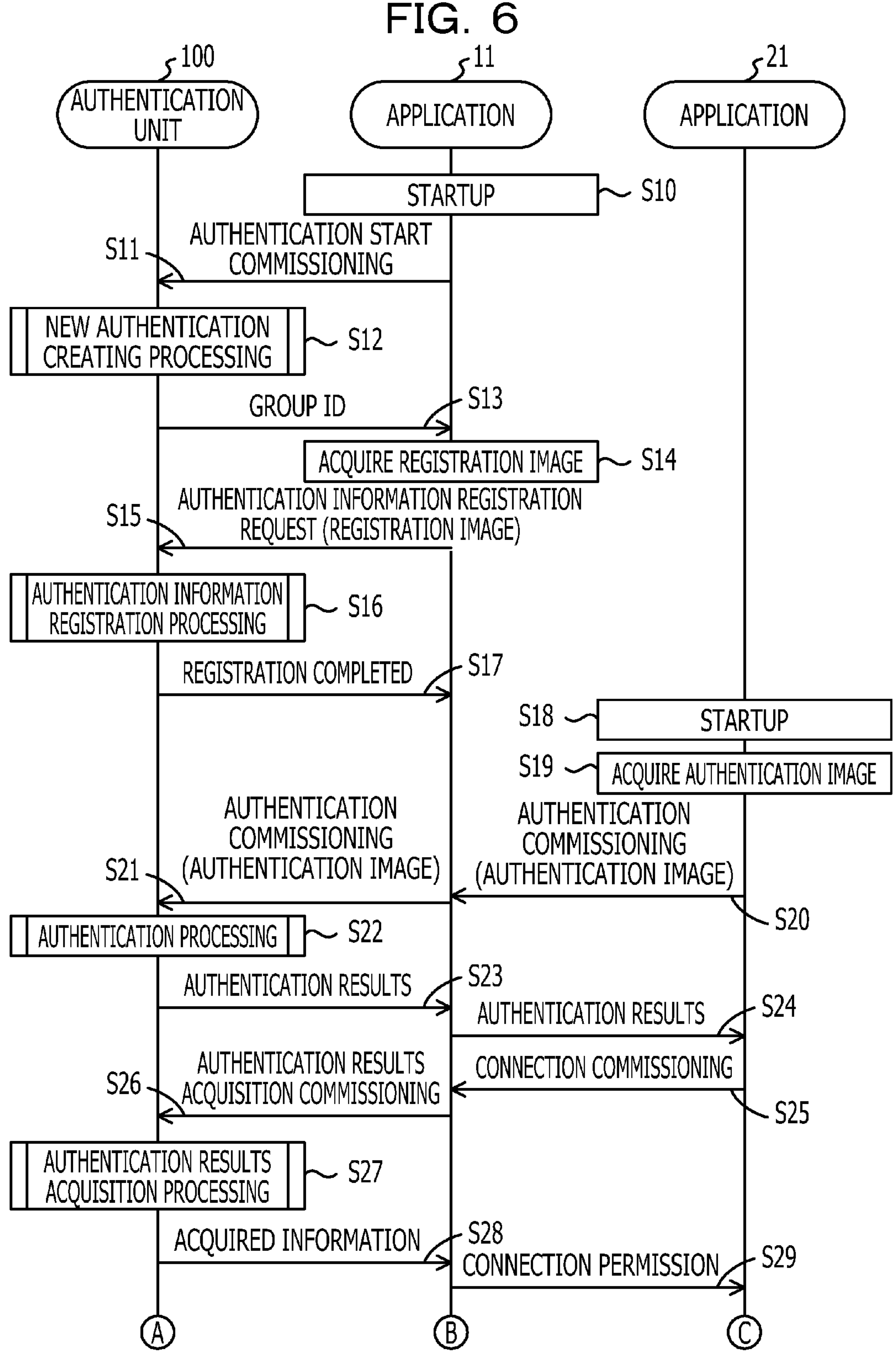
FIG. 6 is a diagram illustrating a sequence of processing relating to authentication by an authentication terminal/participation terminal according to the embodiment.
Figure 7:
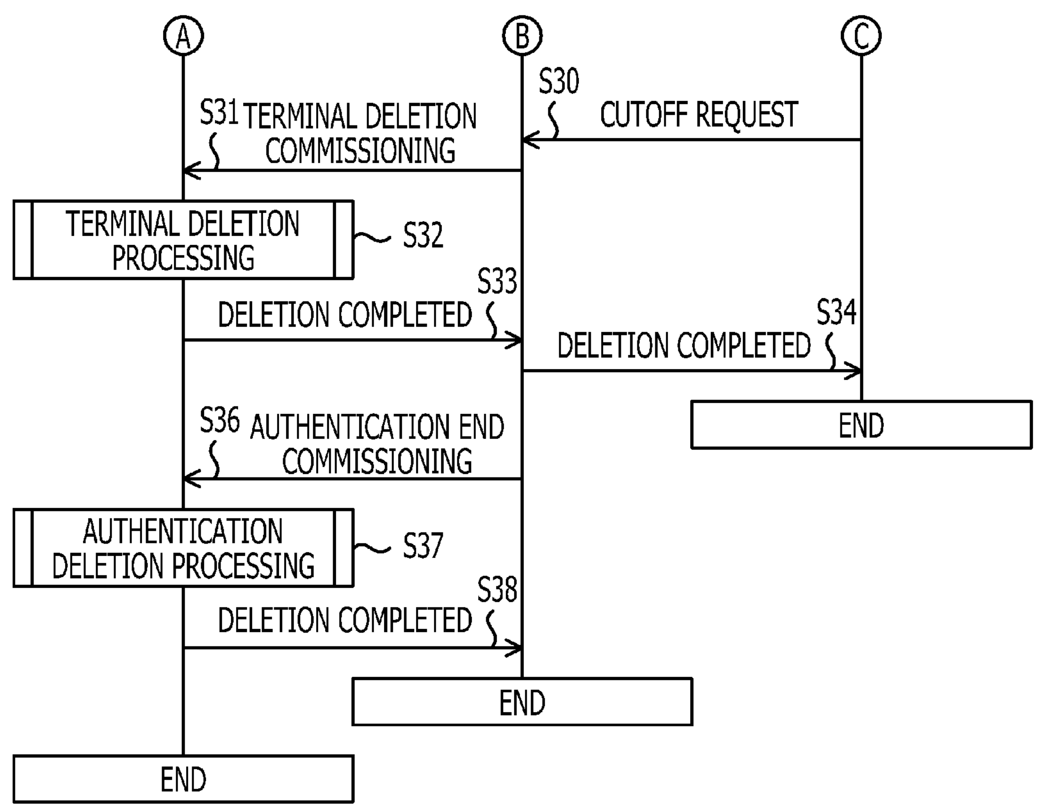
FIG. 7 is a diagram illustrating a sequence of processing relating to authentication by an authentication terminal/participation terminal according to the embodiment.

FIGS. 6 and 7 are diagrams illustrating a sequence of processing relating to authentication by authentication terminal/participating terminals according to the embodiment.

At the authentication terminal 10, the application 11 starts (S10). The application 11 of the authentication terminal 10 commissions the authentication unit 100 to start authentication processing (S11). Upon receiving an authentication start commissioning from the application 11, the authentication unit 100 executes new authentication creating processing by the new authentication creating unit 110 (S12). In the new authentication creating processing, processing such as newly creating authentication information 175 and so forth is performed. Details of the new authentication creating processing will be described later. The authentication unit 100 returns the group ID obtained by the new authentication creating processing to the application 11 (S13).

Now, the application 11 of the authentication terminal 10 controls the camera 12 so as to be in a state capable of shooing. The user operating the authentication terminal 10 shoots the face of a user to participate in a group sharing information. Note that control of the camera 12 by the application 11 may be such that the application 11 effects control so as to be in a state capable of shooing automatically, or effects control so as to be in a state capable of shooing under user instructions. Also, the camera 12 may be controlled so as to be in a state capable of shooing at any time.

The application 11 of the authentication terminal 10 acquires the image shot by the camera 12 as an authentication image (S14). The application 11 of the authentication terminal 10 commissions the authentication unit 100 to perform authentication information registration (S15). At this time, the application 11 hands the registration image to the authentication unit 100. The authentication unit 100 executes authentication information registration processing by the registration control unit 120 (S16). In the authentication information registration processing, processing such as extracting an image of a face from the registration image, giving the image of the face that has been extracted a face ID, registering in the authentication information 175, and so forth, is performed. Details of the authentication information registration processing will be described later. The authentication unit 100 notifies the application 11 of completion of registration of the face information (S17).

Note that, in the event that there is a great number of participating users or the like for example, the processing of S14 through S17 may be repeatedly executed, two or three people at a time. Also, the processing of S14 through S17 may be additionally executed at any point up to S36 for later-participating users.

Subsequently, the application 11 of the authentication terminal 10 controls the network device 13 and starts use of the network 30, in order to receive the authentication commissioning from the participating terminal 20. After starting usage of the network 30, the authentication terminal 10 accepts requests from participating terminals 20.

Now, the application 21 starts at a certain participating terminal 20 (S18). The application 21 of the participating terminal 20 controls the camera 22 so as to be in a state capable of shooting. The user operating the participating terminal 20 at this time shoots his/her own face with the camera 22 of the participating terminal 20. At this time, the user operating the participating terminal 20 may shoot faces of other users along with his/her own face. The application 21 of the participating terminal 20 acquires the image shot with the camera 22 as an authentication image (S19). The application 21 of the participating terminal 20 commissions the application 11 of the authentication terminal 10 to perform authentication (S20). At this time, the application 21 transmits the authentication image to the authentication terminal 10 via the network 30.

At this point, there are cases where the authentication terminal 10 and participating terminal 20 do not have connection information regarding the network 30 such as the IP address of each other, or the like. In such a case, an arrangement may be made where, for example, the participating terminal 20 broadcasts commissioning of authentication, and the authentication terminal 10 accepts the commissioning of authentication. Also, an arrangement may be made wherein, after completion of registration of a face image, the authentication terminal 10 broadcasts a notification to the effect that accepting of commissioning of authentication is now available, whereupon the participating terminal 20 which has received that notification performs commissioning of authentication to the authentication terminal 10 which is the transmission source of the notification.

The authentication terminal 10 receives the authentication commission from the participating terminal 20. Upon determining that this is an authentication commission from the participating terminal 20, the application 11 of the authentication terminal 10 commissions the authentication unit 100 to perform authentication (S21). At this time, the application 11 hands the authentication image received from the participating terminal 20 to the authentication unit 100.

The authentication unit 100 executes authentication processing by the authentication control unit 130 (S22). In the authentication processing, processing is performed in which images of faces are extracted from the authentication image, matching is performed between the extracted face images and face images registered in the authentication information 175, and so forth. In the event that there is even one of the face images extracted from the authentication image matching a face image registered in the authentication information 175 in the authentication processing, the authentication control unit 130 determines the authentication to be successful, for example. Also, with the authentication processing according to the embodiment, additional registration of face images of new users to the authentication information 175 is performed. Details of the authentication processing will be described later.

The authentication unit 100 returns the authentication results to the application 11 (S23). The application 11 of the authentication terminal 10 transmits the authentication results to the participating terminal 20 (S24). Here, we will say that an authentication success has been sent as the authentication results.

The participating terminal 20 receives the authentication results. In the event that the authentication results are authentication successful, the application 21 of the participating terminal 20 transmits a connection commissioning to the authentication terminal 10 (S25). Here, the authentication results are authentication successful, so the application 21 of the participating terminal 20 transmits a connection commissioning to the authentication terminal 10.

The authentication terminal 10 receives the commissioning of connection from the participating terminal 20. Upon determining that this is a commissioning of connection from the participating terminal 20, the application 11 of the authentication terminal 10 commissions the authentication unit 100 to acquire the authentication results (S26). The authentication unit 100 executes authentication results acquisition processing by the authentication results acquiring unit 140 (S27). With the authentication results acquisition processing, information such as whether or not the participating terminal 20 has been authenticated, and so forth, is acquired. The authentication results acquisition processing will be described later. The authentication unit 100 returns acquired information, such as whether or not the participating terminal 20 has been authenticated, and so forth, to the application 11 (S28).

In the event that the participating terminal 20 has been successfully authenticated, the application 11 of the authentication terminal 10 establishes a connection with the participating terminal 20 based on the acquired information. At this time, the application 11 of the authentication terminal 10 transmits a connection permission to the participating terminal 20 as a result as to the connection commissioning from the participating terminal 20 (S29).

The participating terminal 20 receives the result as to the connection commissioning. In the event that a connection has been established by a connection permission, the application 21 of the participating terminal 20 operates cooperatively with the authentication terminal 10.

Note that even after a connection has been established, the user can shoot an image of his/her own face along with the face of another user with the camera 22 of the participating terminal 20, and transmit an authentication image to the authentication terminal 10 to commission authentication. In the event that a connection has already been established, the connection commissioning after the authentication commissioning is not performed. Commissioning of authentication after a connection has already been established is used to add users to participate in the group, forming sub-groups of users within the group, and so forth.

While description has been made so far of the flow of the series of processing in connection between the authentication terminal 10 and participating terminal 20, with regard to a single participating terminal 20, the same processing is performed between other participating terminals 20 participating in the group and the authentication terminal 10. Note that the application 11 of the authentication terminal 10 also performs cooperative processing with the participating terminals 20 which have already been grouped, besides processing at the time of having received authentication or connection commissioning from participating terminals 20.

Description has been made so far regarding the processing sequence from startup of the application 11 and application 21 up to performing cooperative operations between the application 11 and application 21 with the terminals grouped. Now, the sequence of ending the application 11 and application 21 will be described.

At the time of ending the application 21 of the participating terminal 20, the application 21 of the participating terminal 20 transmits a cutoff commissioning to the authentication terminal 10 via the network 30 (S30). Upon determining that this is a cutoff commissioning from the participating terminal 20, the application 11 of the authentication terminal 10 commissions the authentication unit 100 to perform a terminal deletion (S31). The authentication unit 100 executes terminal deletion processing by the terminal deleting unit 150 (S32). Details of terminal deletion processing will be described alter. The authentication unit 100 notifies the application 11 of deletion ended (S33).

The application 11 of the authentication terminal 10 transmits the deletion ended to the participating terminal 20 (S34). The participating terminal 20 receives the deletion ended from the authentication terminal 10. the application 21 of the participating terminal 20 ends the connection. Subsequently, the application 21 quits (S35).

At the time of ending of the application 11 of the authentication terminal 10, the application 11 of the authentication terminal 10 ends use of the network 30. The authentication terminal 10 may end connection with the participating terminals 20 one at a time while communicating with the participating terminals 20, or the authentication terminal 10 side may force-quit the connection.

Thereafter, the application 11 of the authentication terminal 10 commissions the authentication unit 100 to end authentication (S36). The authentication unit 100 performs authentication deletion processing by the authentication deleting unit 160 (S37). With the authentication deletion processing, processing is performed to delete the authentication information 175 and so forth created at the time of startup of the application 11. The authentication unit 100 notifies the application 11 of ending of the deletion (S38). Subsequently, the application 11 quits (S39).

In the example illustrated in FIGS. 6 and 7, processing is performed to generate various types of information such as authentication information 175 at the time of start up of the application 11 of the authentication terminal 10 so as to create a group, and delete the various types of information such as authentication information 175 at the time of quitting so as to dissolve the group. An arrangement may be made wherein the group is left without deleting various types of information such as authentication information 175 even after the application 11 of the authentication terminal 10 quits, so that the group can continued to be used thereafter. In this case, a part of the data may be deleted/initialized, such as deleting data of the authenticated terminal information 185 and clearing the authentication results, for example.

So far, an overview of processing at the application 11 of the authentication terminal 10, the authentication unit 100, and the application 21 of a participating terminal 20, has been described. Next, an example of each processing which the authentication unit 100 performs will be described with reference to flowcharts.

Figure 8:
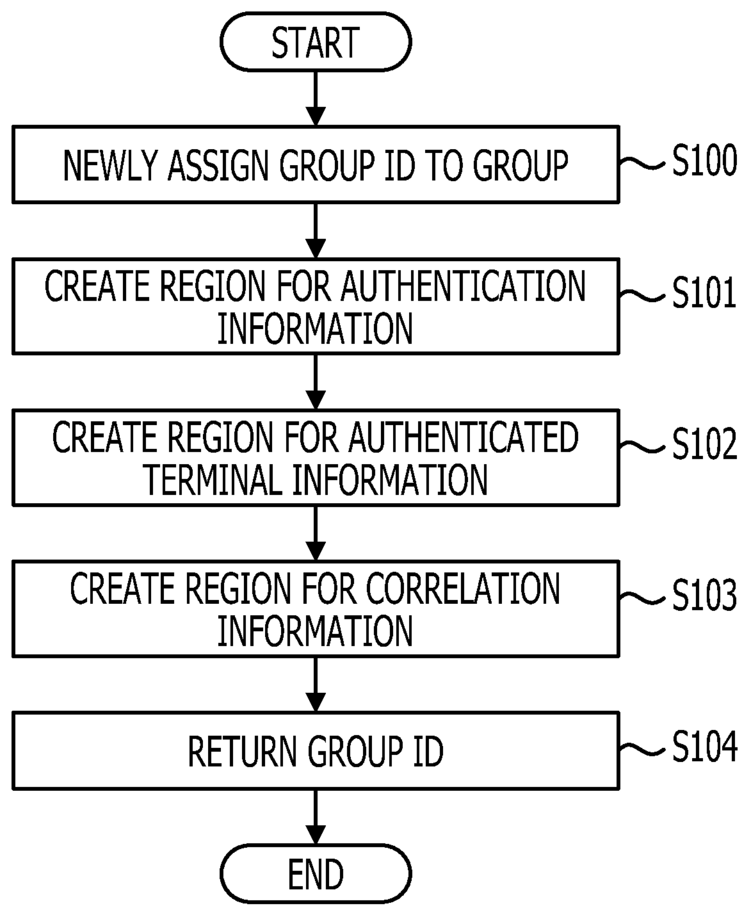
FIG. 8 is a flowchart of processing for newly creating authentication by the authentication unit according to the embodiment.

FIG. 8 is a flowchart of processing for newly creating authentication by the authentication unit according to the embodiment.

In the authentication unit 100, the new authentication creating unit 110 newly assigns a group ID to a group to be newly created, in response to an authentication start commissioning from the application 11 (S100).

The new authentication creating unit 110 creates a region for authentication information 175 of the new group ID in the authentication information storage unit 170 (S101). Also, the new authentication creating unit 110 creates a region for authenticated terminal information 185 for the new group ID in the authenticated terminal information storage unit 180 (S102). Further, the new authentication creating unit 110 creates a region for correlation information 195 for the new group ID in the correlation information storage unit 190 (S103), The new authentication creating unit 110 returns the newly-assigned group ID to the application 11 as output as to the authentication start commissioning (S104), and ends the processing.

Figure 9:
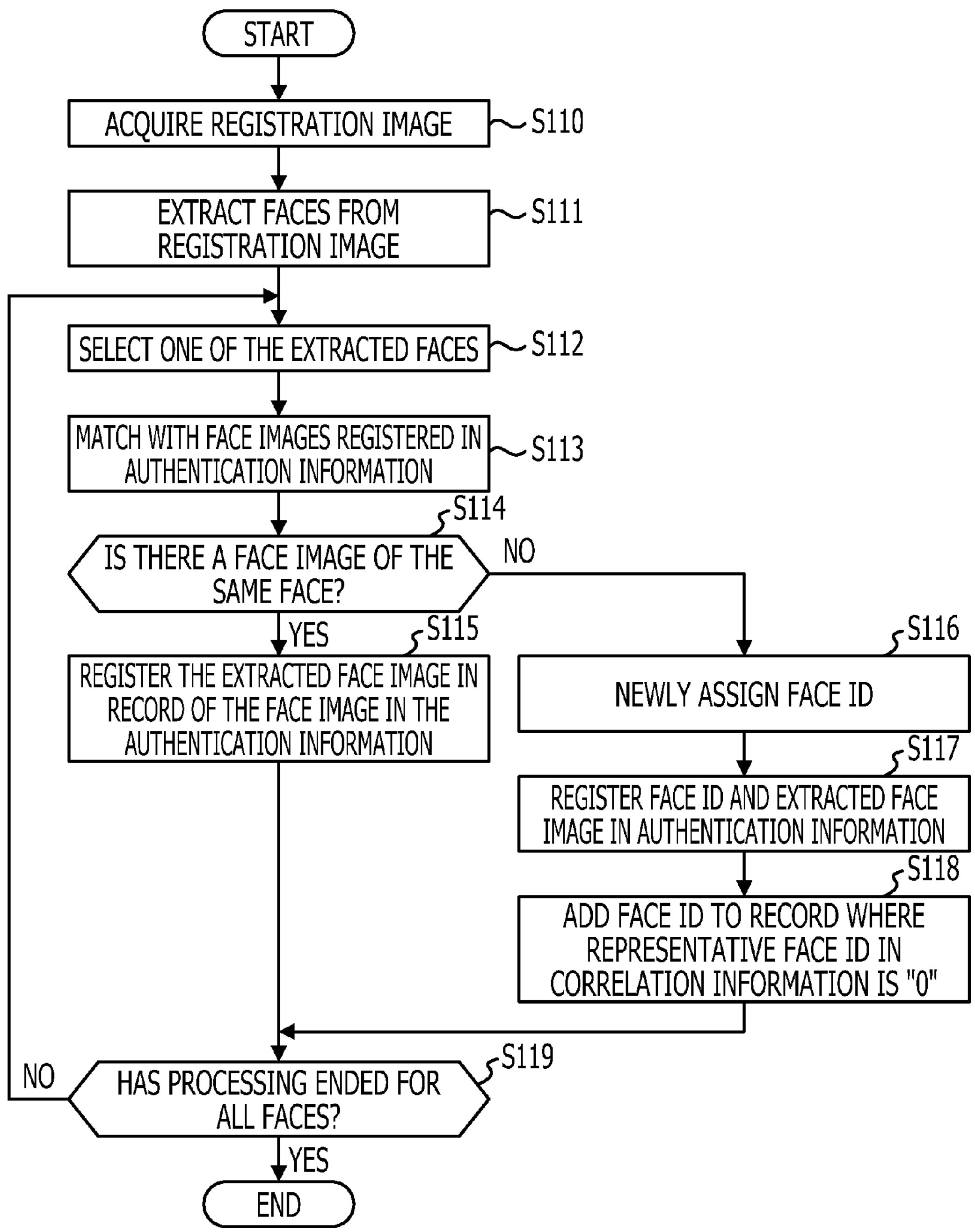
FIG. 9 is a flowchart of authentication information registration processing by the authentication unit according to the embodiment.

FIG. 9 is a flowchart of authentication information registering processing by the authentication unit according to the embodiment.

In the authentication unit 100, upon the registration control unit 120 receiving an authentication information registering commissioning from the application 11, the registration image acquisition unit 121 acquires a registration image (S110). The registration image acquired here is an image shot by the camera 12 of the authentication terminal 10. At this time, the registration control unit 120 receives from the application 11, along with the registration image, a group ID specifying the group regarding which the face image is to be registered, as input of the authentication information registration commissioning. The face extracting unit 122 extracts faces from the acquired registration image (S111).

The face registration unit 123 selects one of the faces extracted from the registration image (S112). The face registration unit 123 matches the image of the face that has been extracted with face images registered in the authentication information 175 of the specified group ID (S113). The face registration unit 123 determines whether or not there is a face image in the authentication information 175 that is the same face as the extracted face, as a result of the matching (S114).

In the event that there is the same face image (YES in S114), the face registration unit 123 additionally registers the image of the extracted face in the record of the face ID regarding which this face image has been registered in the authentication information 175 (S115). Note that the processing in S115 assumes that multiple face images of the same face will be registered in a record of a single face ID. In the event that multiple face images will not be registered in a record of a single face ID, the processing of S115 is not executed. An arrangement may be made where older face images registered in the authentication information 175 are overwritten with the extracted face images.

In the event that there is no face image of the same face (NO in S114), the face registration unit 123 assigns a new face ID to the extracted face (S116). At this time, the face registration unit 123 generates a record for the new face ID in the authentication information 175. the face registration unit 123 registers the newly-assigned face ID and the image of the extracted face in the new record of the authentication information 175 (S117). Also, the face registration unit 123 adds the newly assigned face ID to the record with the representative face ID "0" in the correlation information 195 of the specified group ID (S118).

With the embodiment, the user of the authentication terminal 10 providing information to be shared is a user having a special authority for first deciding a user which is allowed to participate in the group sharing information. Also, as described above, with the embodiment, face ID "0" is a face ID indicating the user of the authentication terminal 10. In the correlation information 195, the record of which the representative face ID is "0" is a special record to which is correlated the face of a user directly allowed by the user of the authentication terminal 10 to participate in the group.

The face registration unit 123 determines whether or not processing has ended for all faces extracted from the registration image (S119). In the event that processing has not ended for all faces (NO in S119), the face registration unit 123 returns to S112, and advances to processing of the next face. In the event that processing has ended for all faces (YES in S119), the registration control unit 120 ends the processing thereof.

Figure 10:
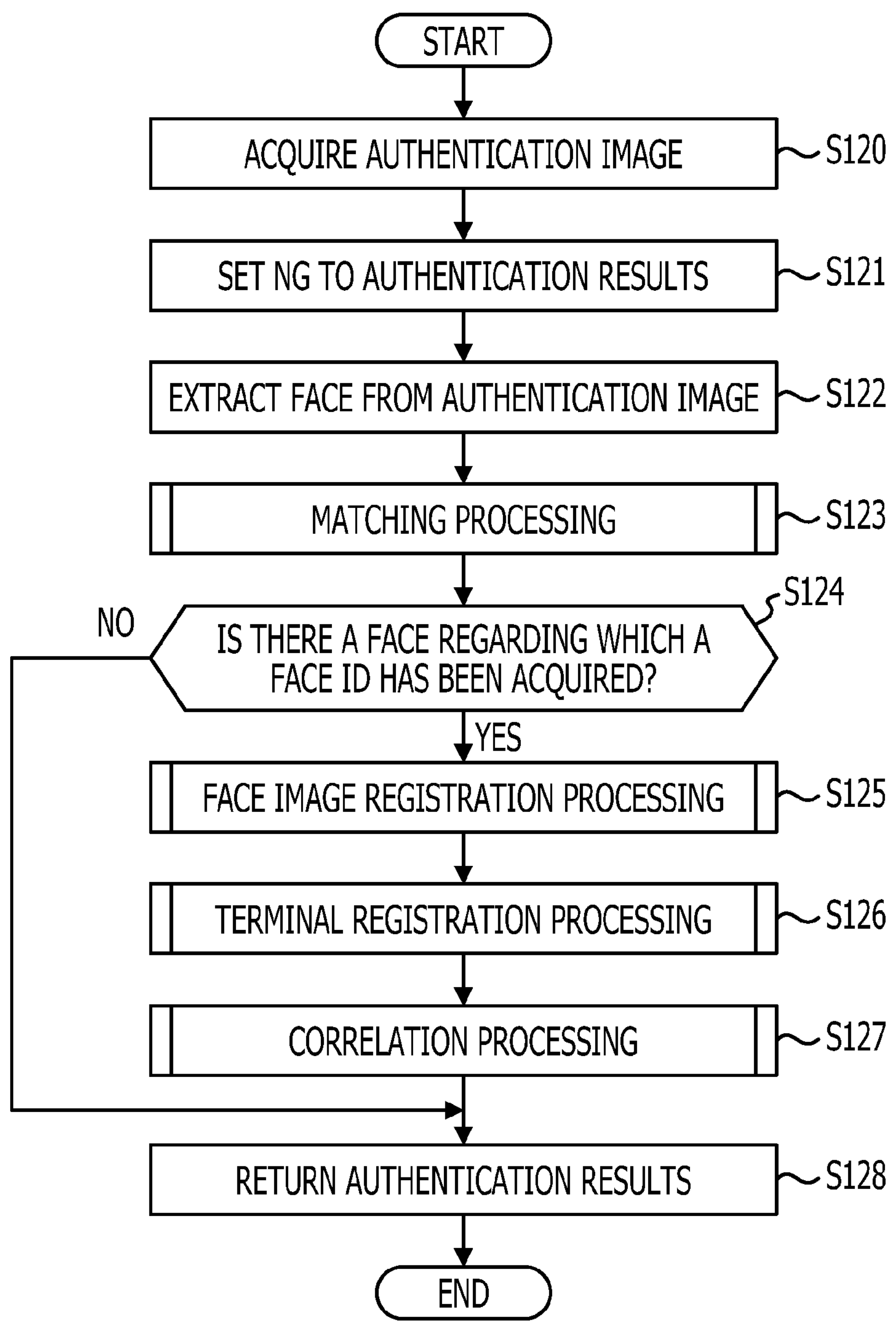
FIG. 10 is a flowchart of authentication processing by the authentication unit according to the embodiment.

FIG. 10 is a flowchart of authentication processing by the authentication unit of the embodiment.

At the authentication unit 100, in the event that the authentication control unit 130 has received an authentication commissioning from the application 11, the acquisition unit 131 acquires an authentication image (S120). The authentication image acquired here is an image shot by the camera 22 of the participating terminal 20. At this time, the authentication control unit 130 receives from the application 11, along with the authentication image, a grout ID specifying the group regarding which authentication is to be performed, and the terminal ID of the participating terminal 20 which has commissioned the authentication, as input of the authentication commissioning. Note that the authentication control unit 130 sets authentication results to "NG" which indicates authentication failed (S121).

The extracting unit 132 extracts faces from the acquired authentication image (S122). The matching unit 133 executes matching processing (S123). The patching processing is processing of matching an image of a face extracted from the authentication image with face images registered in the authentication information 175. Details of matching processing will be described later. From the results of the matching processing, the matching unit 133 determines whether or not there is a face in the authentication image regarding which a face ID has been acquired (S124).

In the event that there is no face regarding which a face ID has been acquired (NO in S124), the authentication control unit 130 returns the authentication result to the application 11 as output as to the authentication commissioning, and ends processing (S128). The authentication results as used here are "NG" indicating authentication failed. To say that no face ID was acquired for the authentication image is to say that there was not the same face in the authentication image as a face image registered in the authentication information 175, meaning that facial recognition has failed.

In the event that there is a face regarding which a face ID has been acquired (YES in S124), the registration unit 134 executes face image registering processing (S125). The face image registering processing is processing of registering an image of a face extracted from the authentication image in the authentication information 175. Details of the face image registering processing will be described later. The terminal registration unit 135 executes terminal registration processing (S126). Terminal registration processing is processing of determining whether or not the participating terminal 20 commissioning authentication has succeeded in authentication based on the matching results of the faces extracted from the authentication image, and registering the participating terminal 20 which has succeeded in authentication in the authenticated terminal information 185. Details of the terminal registration processing will be described later. The correlation determining unit 136 executes correlation processing (S127). This correlation processing is processing of determining the correlation between user faces, from faces in the authentication image. Details of correlation processing will be described later. The authentication control unit 130 returns the authentication results to the application 11 as output as to the authentication commissioning, and ends the processing (S128).

Figure 11:
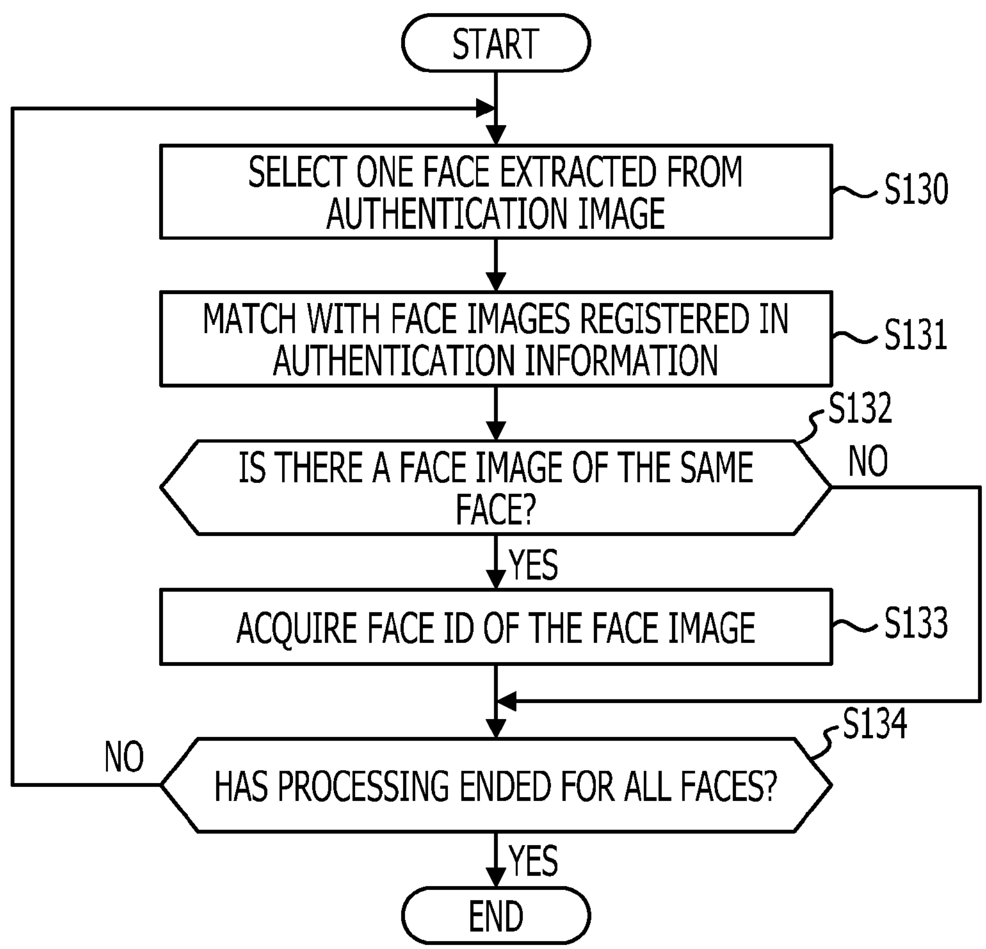
FIG. 11 is a flowchart of matching processing by a matching unit according to the embodiment.

FIG. 11 is a flowchart of matching processing by the matching unit of the embodiment.

The matching unit 133 selects one of the faces extracted from the authentication image (S130). The matching unit 133 matches the image of the extracted face with face images registered in the authentication information 175 of the specified group ID (S131).

The matching unit 133 determines from the results of matching whether or not there is a face image of the same face as the face extracted from the authentication image, in the authentication information 175 (S132). In the event that there is a face image of the same face (YES in S132), the matching unit 133 acquires the face ID of the record in which this face image has been registered in the authentication information 175 (S133).

The matching unit 133 determines whether processing has been ended for all faces extracted from the authentication image (S134). In the event that processing has not ended for all faces (NO in S134), the matching unit 133 returns to S130 and goes to processing of the next face. In the event that processing has ended for all faces (YES in S134), the matching unit 133 ends processing.

Figure 12:
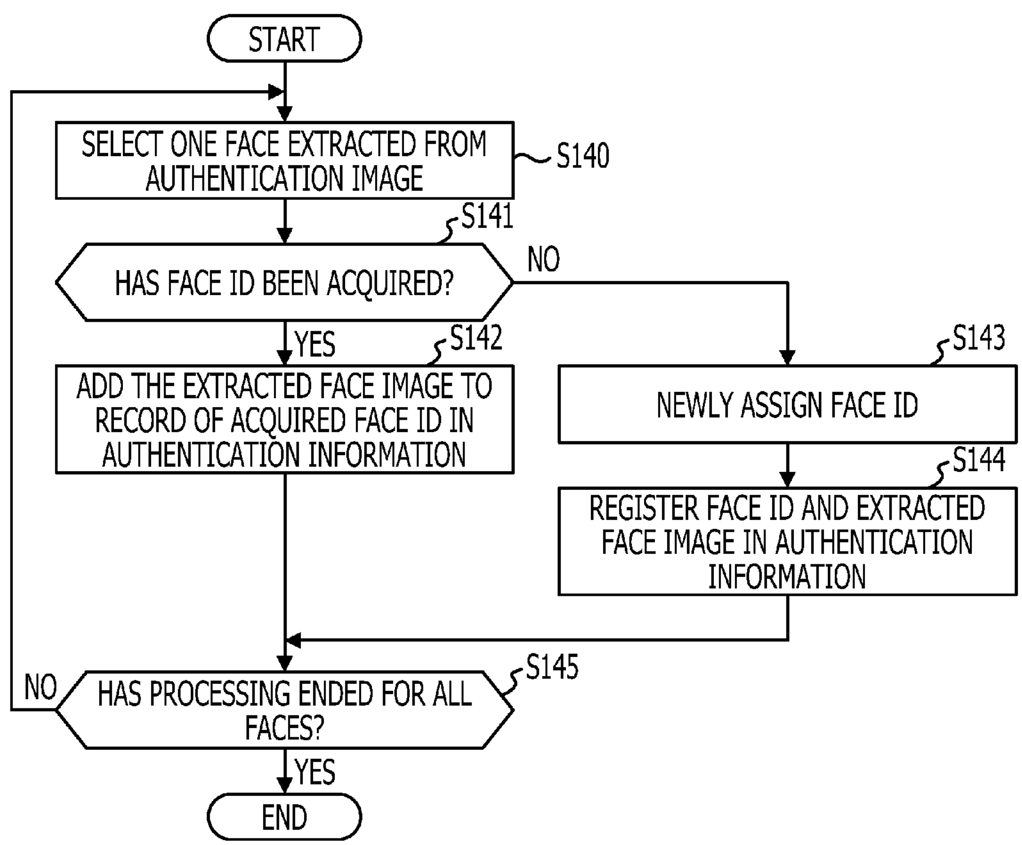
FIG. 12 is a flowchart of face image registration processing by a registration unit according to the embodiment.

FIG. 12 is a flowchart of face image registration processing by the registration unit of the embodiment.

The registration unit 134 selects one of the faces extracted from the authentication image (S140). The registration unit 134 determines whether or not a face ID has been acquired by the matching processing for the selected face (S141).

In the event that a face ID has been acquired (YES in S141), the registration unit 134 additionally registers the image of the extracted face to the record of the face ID that has been acquired in the authentication information 175 for the specified group ID (S142). Note that in the same way as with the processing of S115 for authentication information registration processing illustrated in FIG. 9, the processing of S142 assumes registering multiple face images of the same face in a record of a single face ID.

In the event that no face Id has been acquired (NO in S141), the registration unit 134 newly assigns a face ID to the face extracted from the selected authentication image (S143). At this time, the registration unit 134 generates a record for the new face ID in the authentication information 175. The registration unit 134 registers the newly-assigned face ID and the image of the extracted face, in the new record in the authentication information 175 (S144).

The registration unit 134 determines whether or not processing has ended for all faces extracted from the authentication image (S145). In the event that processing has not ended for all faces (NO in S145), the registration unit 134 returns to S140, and goes to processing of the next face. In the event that processing has ended for all faces (YES in S145), the registration unit 134 ends the processing.

Due to the face image registration processing illustrated in FIG. 12, a face image to be used for facial recognition can be additionally registered in the authentication information 175, even from an image shot with the participating terminal 20. At this time, processing is performed upon the condition that a face registered in the authentication information 175 is extracted from the image shot by the participating terminal 20 along with the face to be additionally registered, so a certain level of reliability of authentication is secured.

Figure 13:
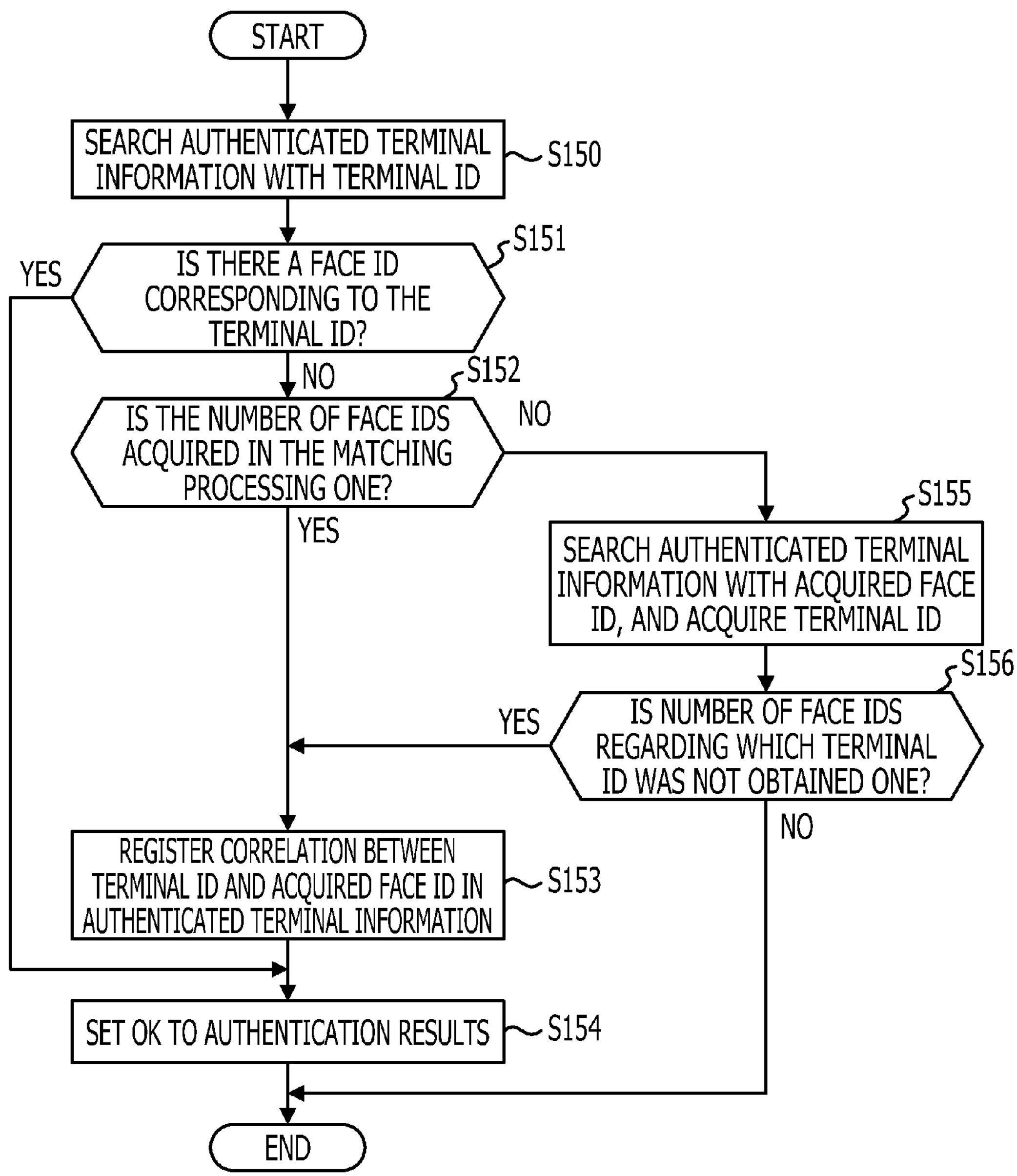
FIG. 13 is a flowchart of terminal registration processing by a terminal registration unit according to the embodiment.

FIG. 13 is a flowchart of terminal registration processing by the terminal registration unit of the embodiment.

The terminal registration unit 135 searches for an authenticated terminal information 185 of the specified group ID, with the terminal ID of the participating terminal 20 commissioning the authentication (S150). The terminal registration unit 135 determines whether or not there is a face ID corresponding to the terminal ID in the authenticated terminal information 185, as a result of the search (S151).

In the event that there is a face ID corresponding to the terminal ID (YES in S151), the terminal registration unit 135 sets "OK" indicating authentication successful for the authentication results (S154), and ends the processing.

This case is a case where the terminal ID of the participating terminal 20 commissioning the authentication has already been registered in the authenticated terminal information 185. That is to say, the participating terminal 20 commissioning the authentication has already succeeded in authentication in authentication processing performed in the past. This case is a case wherein, for example, a face image of a user not registered in the authentication information 175 is to be registered from a participating terminal 20 of a user of whose face image has been registered in the authentication information 175, a case wherein correlation of user faces with each other is intended, and so forth.

In the event that there is no corresponding face ID in the terminal ID (NO in S151), the terminal registration unit 135 determines whether or not the number of face IDs acquired by the matching processing is one (S152).

In the event that the number of face IDs acquired by the matching processing is one (YES in S152), the terminal registration unit 135 registers the correlation of the terminal ID of the participating terminal 20 which has commissioned the authentication, and the face ID obtained by the matching processing, in the authenticated terminal information 185 (S153). The terminal registration unit 135 sets "OK" indicating authentication successful for the authentication results (S154), and ends the processing.

This case is a case wherein the participating terminal 20 has not yet succeeded in authentication, and just one face registered in the authentication information 175 has been extracted from the authentication image sent from the participating terminal 20. With this case, only one face registered in the authentication information 175 is extracted from the authentication image, so the face ID of that face and the terminal ID of the participating terminal 20 can be correlated and registered in the authenticated terminal information 185.

In the event that the number of faces acquired by matching processing is not one (NO in S152), the terminal registration unit 135 searches the authenticated terminal information 185 of the specified group ID with the face ID acquired in the matching processing, and acquires the terminal ID (S155). The terminal registration unit 135 determines whether or not the number of face IDs regarding which a terminal ID was not obtained by searching is one (S156).

In the event that the number of face IDs regarding which a terminal ID was not obtained is other than one (NO in S156), the processing ends there. In this case, the authentication result is "NG" indicating failure.

This case is a case where the number of face IDs regarding which a terminal ID was not obtained is either zero, or two or more. For example, in the event that the number of face IDs regarding which a terminal ID was not obtained is zero, this means that all of the multiple face IDs acquired by the matching processing have already been correlated with a terminal ID in the authenticated terminal information 185. Also, in the event that the number of face IDs regarding which a terminal ID was not obtained is two or more, this is a case where the number of face IDs not yet correlated with a terminal ID in the authenticated terminal information 185 is two or more. In such a case, the face ID to be correlated with the terminal ID of the participating terminal 20 commissioning the authentication is not yet narrowed down to one.

In the event that the number of face IDs regarding which a terminal ID was not obtained is one (YES in S156), the terminal registration unit 135 registers in the authenticated terminal information 185 the correlation between the terminal ID of the participating terminal 20 which has commissioned the authentication and the face ID acquired by the matching processing (S153). The terminal registration unit 135 sets "OK" indicating authentication successful for the authentication results (S154), and ends the processing.

This case is a case where there are multiple face IDs acquired by the matching processing, and of these face IDs, the number of face IDs not correlated with a terminal ID in the authenticated terminal information 185 is one. Even in the event that the number of face IDs acquired in the matching processing is multiple, as long as the number of face IDs correlated with the terminal ID is one, that face ID can be correlated with the terminal ID of the participating terminal 20 which has commissioned the authentication.

FIG. 14 is a flowchart of correlation processing by the correlation determining unit according to the embodiment.

The correlation determining unit 136 determines whether or not multiple faces have been extracted from the authentication image (S160). Extracting of faces from the authentication image has been performed by the extracting unit 132 in the processing of S122.

In the event that multiple faces have been extracted from the authentication image (YES in S160), the correlation determining unit 136 determines whether or not a face of a face ID corresponding to the terminal ID of the participating terminal 20 which has commissioned the authentication has been extracted from the authentication image (S161). A face ID corresponding to the terminal ID of the participating terminal 20 which has commissioned the authentication is searched from the authenticated terminal information 185 of the specified group ID. The a face ID corresponding to the terminal ID of the participating terminal 20 which has commissioned the authentication has been searched in the terminal registration processing by the terminal registration unit 135, so that information may be used.

In the event that a face of a face ID corresponding to the terminal ID has been extracted from the authentication image (YES in S161), the correlation determining unit 136 sets the face ID corresponding to the terminal ID as the representative ID in the correlation information 195 of the specified group ID, registers other face IDs of faces extracted from the authentication image as being a set (S162), and ends the processing.

This case is a case where a face correlated with the participating terminal 20 which has sent the authentication image is included in the multiple faces extracted from that authentication image. The record of the correlation information 195 in this case is a record in which the face ID of the face correlated with the participating terminal 20 in the authenticated terminal information 185 is the representative face ID.

In the event that there is no face of a face ID corresponding to the terminal ID extracted from the authentication image (NO in S161), the correlation determining unit 136 registers the face IDs of the faces extracted from the authentication image in the correlation information 195 of the specified group ID as a set (S163), and the processing ends. At this time, there is no representative face ID.

This case is a case where there is no face correlated with the participating terminal 20 which has sent the authentication image, in the multiple faces extracted from the authentication image. The record of the correlation information 195 in this case is a record with no representative face ID.

In the event that multiple faces have not been extracted from the authentication image (NO in S160), that is to say, in the event that the number of faces extracted from the authentication image is one, the correlation determining unit 136 searches the authenticated terminal information 185 with the face ID of the face extracted from the authentication image, and acquires the corresponding terminal ID (S164). The face ID of the face extracted from the authentication image has been acquired in the matching processing in S123. The correlation determining unit 136 determines whether or not multiple terminal IDs corresponding to the face ID of the face extracted from the authentication image have been acquired (S165).

In the event that multiple terminal IDs have not been acquired (NO in S165), i.e., in the event that the number of acquired terminal IDs is one or less, the correlation determining unit 136 ends the processing there.

In the event that multiple terminal IDs have been acquired (YES in S165), the correlation determining unit 136 searches the correlation information 195 of the specified group ID for the record of just the face ID of the face extracted from the authentication image (S166). The correlation determining unit 136 determines whether or not there is a record of just the face ID of the face extracted from the authentication image as a result of the search (S167).

In the event that there is such a record (YES in S167), the correlation determining unit 136 ends the processing there.

In the event that there is no such record (NO in S167), the correlation determining unit 136 registers just the face ID of the face extracted from the authentication image in the correlation information 195 of the specified group ID (S168), and ends the processing. In this case, there is no representative face ID.

S164 through S168 are a case where, in the event of multiple terminal IDs having been correlated to one face ID, that face ID is registered in correlation information 195. The record of the correlation information 195 in this case is a record of only one face ID, with no representative face ID.

Figure 15:
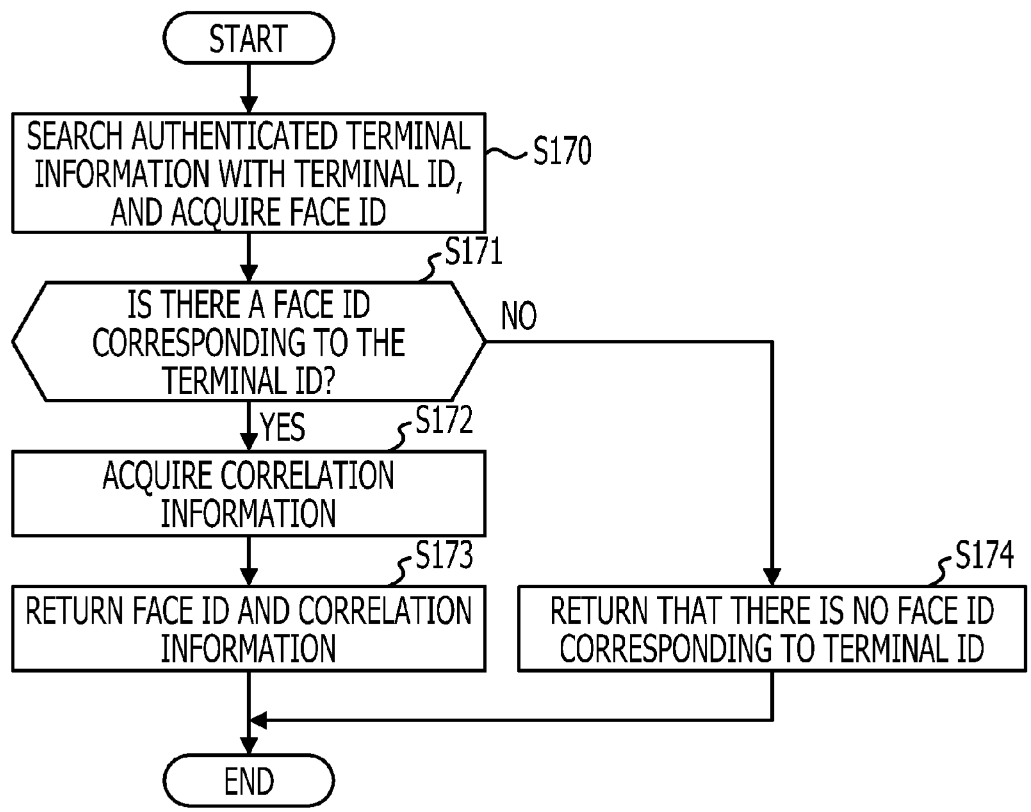
FIG. 15 is a flowchart of authentication results acquisition processing by the authentication unit according to the embodiment.

FIG. 15 is a flowchart of authentication results acquiring processing by the authentication unit of the embodiment.

At the authentication unit 100, upon receiving an authentication results acquiring commissioning from the application 11, the authentication results acquiring unit 140 searches the authenticated terminal information 185 of the specified group ID with the specified terminal ID, and acquires a face ID corresponding to the specified terminal ID (S170). Note that at the time of having received the authentication results acquiring commissioning from the application 11, the authentication results acquiring unit 140 has received the group ID specifying the group regarding which authentication results are to be acquired, and the terminal ID specifying the participating terminal 20 regarding which authentication results are to be acquired, from the application 11. The authentication results acquiring unit 140 determines whether or not there is a face ID corresponding to the specified terminal ID (S171).

In the event that there is a face ID corresponding to the specified terminal ID (YES in S171), the authentication results acquiring unit 140 acquires the correlation information 195 of the specified group ID from the correlation information storage unit 190 (S172). The authentication results acquiring unit 140 returns the face ID corresponding to the specified terminal ID and the correlation information 195 of the specified group ID to the application 11 as output as to the authentication results acquiring request (S173) and ends the processing.

If correspondence between the terminal ID and face ID has been recorded in the authenticated terminal information 185, this implies that the participating terminal 20 of the terminal ID has succeeded in authentication. Here, in the event that the participating terminal 20 of the specified terminal ID has succeeded in authentication, the authentication results acquiring unit 140 hands over the correlation information 195 and the face ID corresponding to the specified terminal ID, thereby notifying the application 11 that the authentication result of this participating terminal 20 is "OK". The application 11 is enabled to perform group administration using the correlation information 195.

In the event that there is no face ID corresponding to the specified terminal ID (NO in S171), the authentication results acquiring unit 140 returns to the application 11 that there is no face ID corresponding to the specified terminal ID (S174), and ends the processing.

If no correspondence between the terminal ID and face ID has been recorded in the authenticated terminal information 185, this implies that the participating terminal 20 of the terminal ID has not been authenticated. Here, the authentication results acquiring unit 140 makes notification to the effect that there is no face ID corresponding to the specified terminal ID, thereby notifying the application 11 that the authentication result of this participating terminal 20 is "NG" indicating failure.

Figure 16:
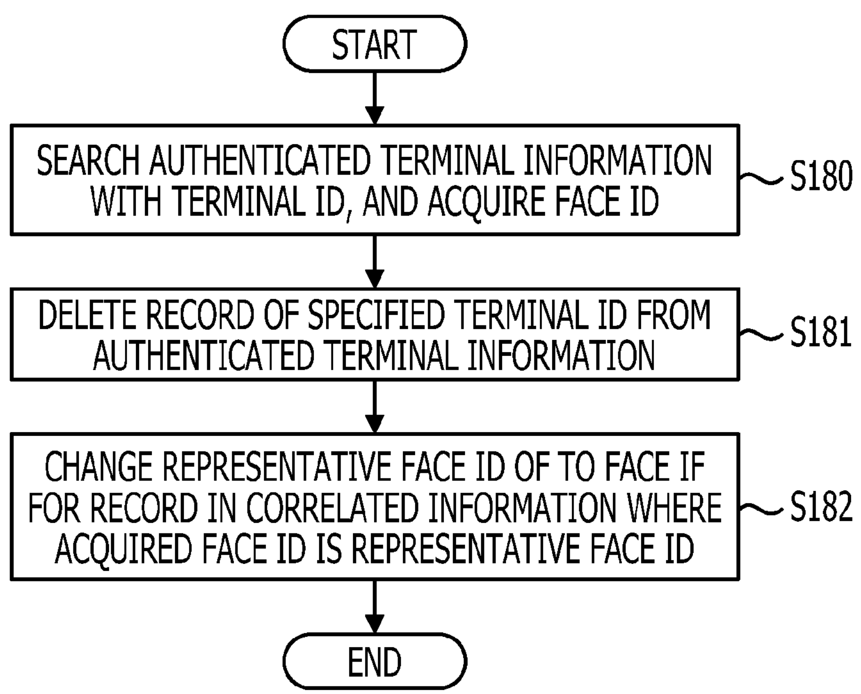
FIG. 16 is a flowchart of terminal deletion processing by the authentication unit according to the embodiment.

FIG. 16 is a flowchart of terminal deletion processing by the authentication unit according to the embodiment.

At the authentication unit 100, upon having received a terminal deletion commissioning from the application 11, the terminal deleting unit 150 searches the authenticated terminal information 185 of a specified group ID with a specified terminal ID, and acquires a face ID corresponding to the specified terminal ID (S180). Note that at the time of having received the terminal deletion commissioning from the application 11, the terminal deleting unit 150 has received the group ID specifying the group regarding which terminal deletion is to be performed, and the terminal ID specifying the participating terminal 20 to be deleted, from the application 11.

The terminal deleting unit 150 deletes the record of the specified terminal ID in the authenticated terminal information 185 (S181). For a record where the face ID acquired in S180 is a representative face ID in the correlation information 195 of the specified group ID, the terminal deleting unit 150 changes the representative face ID to a normal face ID (S182), and ends the processing.

With the embodiment, the terminal deleting unit 150 dissolves authentication of the participating terminal 20 of the specified terminal ID by deleting the record of the specified terminal ID from the authenticated terminal information 185. In the event the participating terminal 20 which has performed the authentication commissioning has succeeded in authentication as illustrated in FIG. 14, the face ID corresponding to the terminal ID of that participating terminal 20 is recorded as the representative face ID in the correlation information 195, in the event that the face of this face ID has been extracted from the authentication image. By dissolving the authentication of the participating terminal 20 of the terminal ID corresponding to the representative face ID, the prerequisites of a representative face ID are no longer met, so with the embodiment, the representative face ID of a record where the face of the ID corresponding to the terminal ID of a participating terminal 20 regarding which authentication has been dissolved is changed to a normal face ID.

Now, the correlation information 195 may be left as it is without changing the representative face ID to a normal face ID. Also, an arrangement may be made where the record in the correlation information 195 in which the face ID acquired in S180 is a representative face ID, is deleted. Also, an arrangement may be made wherein terminal deletion processing is executed in the event that an image including a face correlated with the participating terminal 20 in the authenticated terminal information 185 is sent from that authenticated participating terminal 20.

Figure 17:
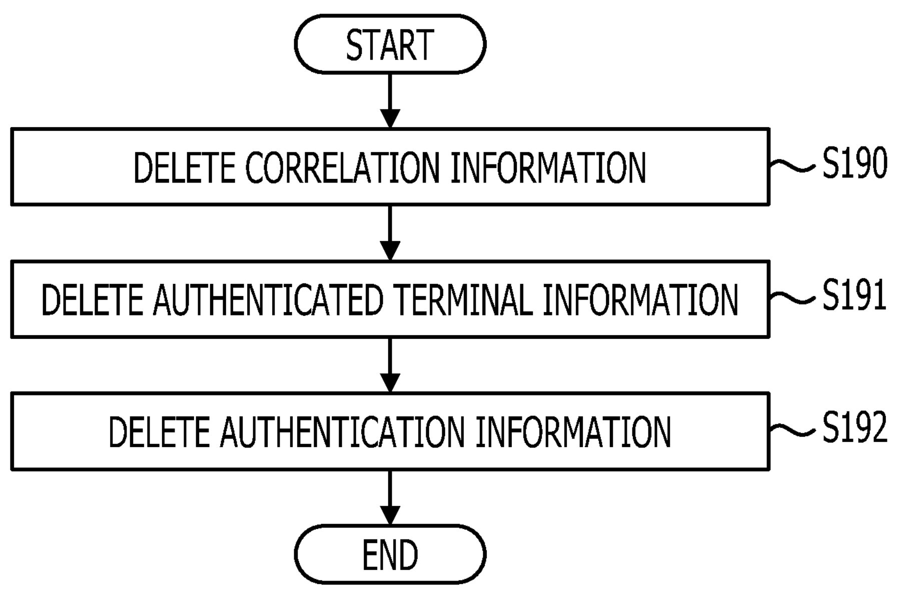
FIG. 17 is a flowchart of authentication deletion processing by the authentication unit according to the embodiment.

FIG. 17 is a flowchart illustrating authentication deletion processing by the authentication unit of the embodiment.

Upon having received an authentication deletion commissioning from the application 11, the authentication deleting unit 160 of the authentication unit 100 deletes the correlation information 195 of the specified group ID from the correlation information storage unit 190 (S190). Also, the authentication deleting unit 160 deletes the authenticated terminal information 185 of the specified group ID from the authenticated terminal information storage unit 180 (S191). Further, the authentication deleting unit 160 deletes the authentication information 175 of the specified group ID from the authentication information storage unit 170 (S192). Note that upon having received an authentication deletion request from the application 11, the authentication deleting unit 160 has received a group ID specifying the group regarding which the authentication is to be deleted from the application 11.

The following are specific embodiments using the technology according to the embodiment.

First Embodiment

Figure 18:
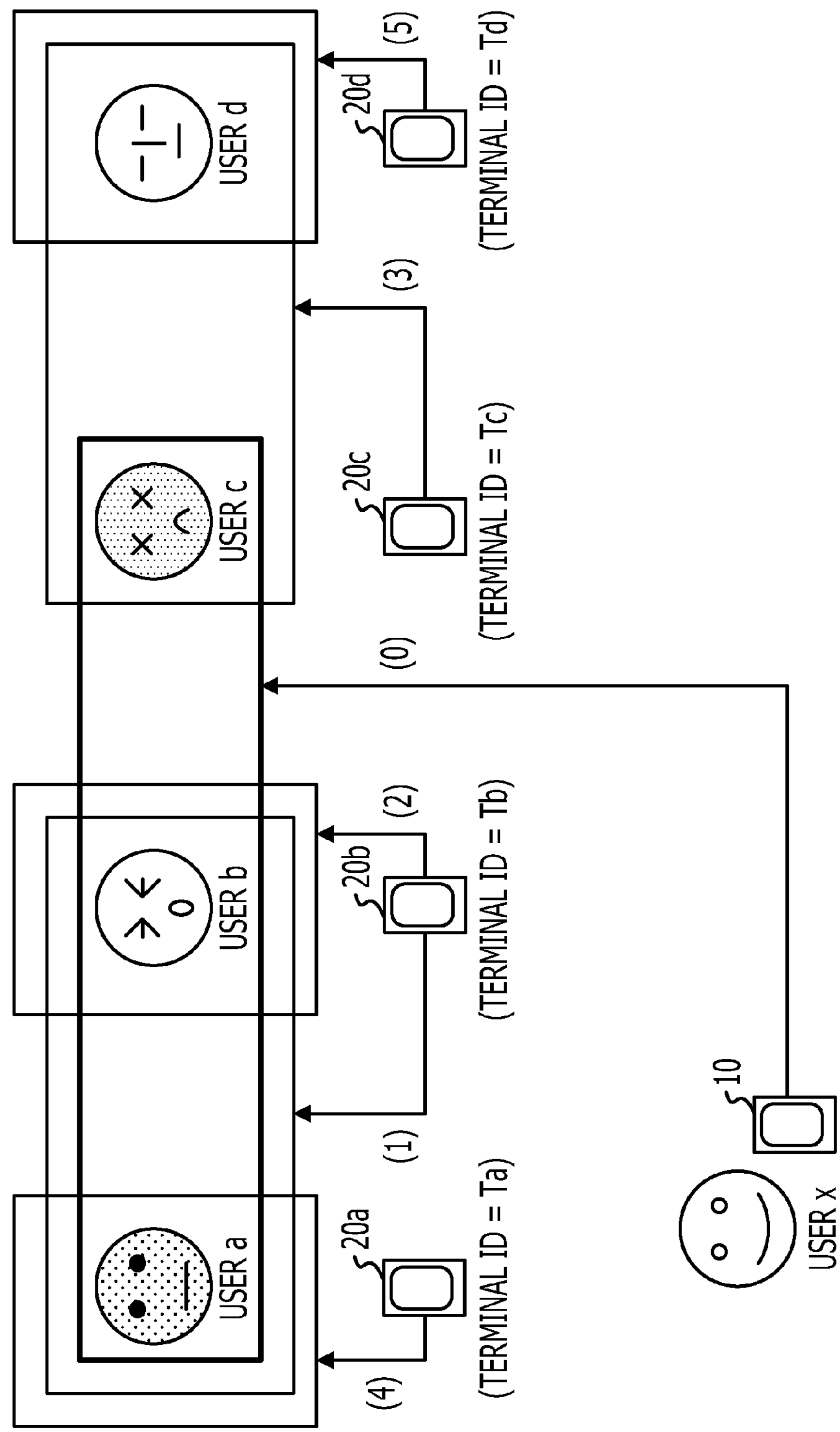
FIG. 18 illustrates shooting procedures of user faces according to a first embodiment.

FIG. 18 illustrates shooting procedures of faces of users according to a first embodiment.

In the first embodiment, we will say that shooting of the faces of users has been performed according to the following procedures to create a new group. In FIG. 18, the numerals in parentheses indicate the order in which the user faces were shot. Now, we will say that a group ID "$G_1$" has been assigned to the group being newly created here.

(0) A user x operating the authentication terminal 10 shoots the faces of a user a, user b, and user c, with the camera 12 of the authentication terminal 10. The obtained images are subjected to processing at the authentication unit 100 of the authentication terminal 10 as they are, as initial registration images.

(1) The user b operating the participating terminal 20*b* shoots the face of the user a and user b with the camera 22 of the participating terminal 20*b*. The obtained image is sent from the participating terminal 20*b* to the authentication terminal 10 as an authentication image. Let up say that the terminal ID of the participating terminal 20*b* is "$T_b$".

(2) The user b operating the participating terminal 20*b* shoots the face of the user b with the camera 22 of the participating terminal 20*b*. The obtained image is sent from the participating terminal 20*b* to the authentication terminal 10 as an authentication image.

(3) The user c operating the participating terminal 20*c* shoots the face of the user c and user d with the camera 22 of the participating terminal 20*c*. The obtained image is sent from the participating terminal 20*c* to the authentication terminal 10 as an authentication image. Let up say that the terminal ID of the participating terminal 20*c* is "$T_c$".

(4) The user a operating the participating terminal 20*a* shoots the face of the user a with the camera 22 of the participating terminal 20*a*. The obtained image is sent from the participating terminal 20*a* to the authentication terminal 10 as an authentication image. Let up say that the terminal ID of the participating terminal 20*a* is "$T_a$".

(5) The user d operating the participating terminal 20*d* shoots the face of the user d with the camera 22 of the participating terminal 20*d*. The obtained image is sent from the participating terminal 20*d* to the authentication terminal 10 as an authentication image. Let up say that the terminal ID of the participating terminal 20*d* is "$T_d$".

With the first embodiment, only the image obtained by the shooting according to the first procedure (0) serves as a registration image, and the images obtained by the shooting according to procedure (1) through procedure (5) serve as authentication images. The images shot with the participating terminals 20 are sent to the authentication terminal 10, and processed at the authentication unit 100.

Figure 19:
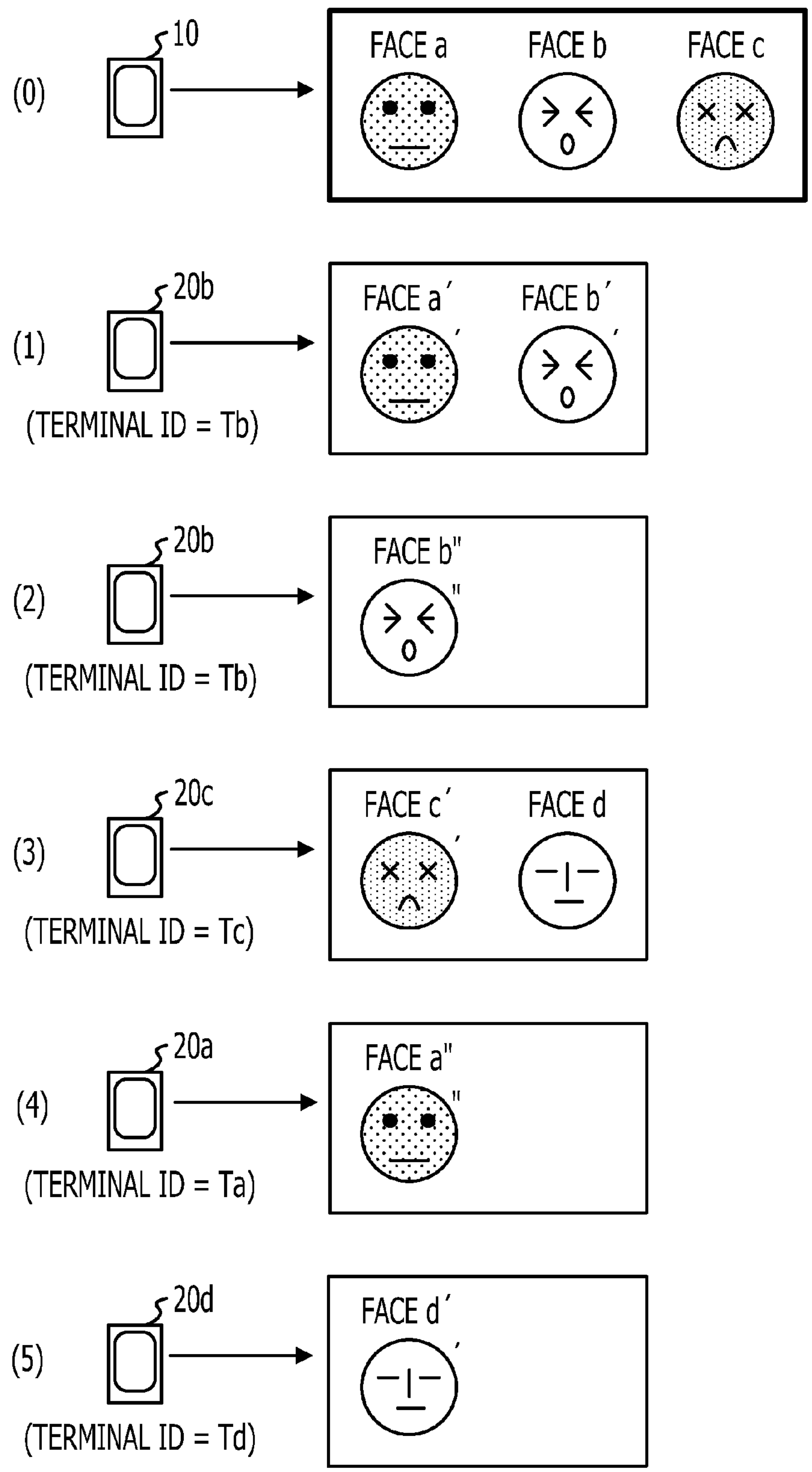
FIG. 19 is a diagram illustrating faces extracted from images obtained by procedures according to the first embodiment.

FIG. 19 is a diagram illustrating faces extracted from images obtained by the procedures according to the first embodiment.

FIG. 19 illustrates the relation between the shooting terminals in procedure (0) through procedure (5) according to the first embodiment, and the faces extracted from the images obtained by shooting.

FIG. 20 is a diagram illustrating an example of authentication information according to the first embodiment.

The authentication information 175*a* illustrated in FIG. 20 is an example of authentication information 175 of the group with the group ID "$G_1$" according to the first embodiment.

FIG. 21 is a diagram illustrating an example of authenticated terminal information according to the first embodiment.

The authenticated terminal information 185*a* illustrated in FIG. 21 is an example of the authenticated terminal information 185 of the group with the group ID "$G_1$" according to the first embodiment.

FIG. 22 is a diagram illustrating an example of correlation information according to the first embodiment.

The correlation information 195*a* illustrated in FIG. 22 is an example of the correlation information 195 of the group with the group ID "$G_1$" according to the first embodiment.

Description will be made regarding the flow of the series of processing by the authentication unit 100 from the new group with the group ID "$G_1$" being created up to processing for shooting in procedure (5) according to the first embodiment, with reference to FIGS. 19 through 22.

In procedure (0), the registration image acquisition unit 121 of the registration control unit 120 in the authentication unit 100 acquires the registration image shot by the authentication terminal 10. The face extracting unit 122 extracts the face a of the user a, the face b of the user b, and the face c of the user c, from the acquired registration image, as illustrated in FIG. 19. The face registration unit 123 issues a face ID to the face of each user. Here, a face ID "$F_a$" is issued to the face a of the user a, a face ID "$F_b$" to the face b of the user b, and a face ID "$F_c$" to the face c of the user c.

The face registration unit 123 registers images of the faces of each user extracted by the registration image acquisition unit 121 in the authentication information 175*a* of the group ID "$G_1$", correlated with the issued face ID. At this time, at the authentication information 175*a*, an image of the face a of the user a is registered in a face image (#01) of a record of face ID "$F_a$", an image of the face b of the user b in a face image (#01) of a record of face ID "$F_b$", and an image of the face c of the user c is registered in a face image (#01) of a record of face ID "$F_c$".

Also, the face registration unit 123 records the face IDs "$F_a$", "$F_b$", and "$F_c$" of the faces extracted from the registration image in the record of the representative face ID "0" in the correlation information 195*a* of the group ID "$G_1$". This is recording of the correlation of faces extracted from the registration image shot at the particular authentication terminal 10, so the correlation of these faces is recorded in the record of which the representative face ID in the correlation information 195*a* is "0". This record is a first record of the correlation information 195*a* illustrated in FIG. 22.

In procedure (1), the acquisition unit 131 of the authentication control unit 130 of the authentication unit 100 acquires the authentication image shot with the participating terminal 20*b*. As illustrated in FIG. 19, a face a' of the user a and a face b' of the user b are extracted from the acquired authentication image.

The matching unit 133 matches the image of the face a' and the image of the face b' extracted from the authentication image with the face images recorded in the authentication information 175*a*, and determines whether the same face images are registered in the authentication information 175*a*. Here, determination is made that the extracted face a' is the same face as the face a of which the face image is registered in the authentication information 175*a*, and that the extracted face b' is the same face as the face b of which the face image is registered in the authentication information 175*a*.

The registration unit 134 registers the image of the face a' in the face image (#02) of the record of face ID "$F_a$" in the authentication information 175*a*. The registration unit 134 also registers the image of the face b' in the face image (#02) of the record of face ID "$F_b$" in the authentication information 175*a*.

The matching unit 133 has determined that the face a' is the face of the face ID "$F_a$", and that the face b' is the face of the face ID "$F_b$", but at this point, neither face ID "$F_a$" nor "$F_b$" have been correlated with a participating terminal 20 at the authenticated terminal information 185*a*. At this point, the terminal registration unit 135 is not yet capable of determining which of the face ID "$F_a$" and the face ID "$F_b$" that the terminal ID "$T_b$" of the participating terminal 20*b* which has sent the authentication image has to be correlated with. Here, the terminal registration unit 135 determines that authentication of the participating terminal 20*b* has been unsuccessful, and registration of the participating terminal 20*b* to the authenticated terminal information 185*a* is not performed.

Since multiple faces have been extracted from the authentication image, the correlation determining unit 136 adds a record to the correlation information 195*a* of the group ID "$G_1$" in which the face ID "$F_a$" corresponding to the face a' and the face ID "$F_b$" corresponding to the face b' are registered in a correlated manner. At this time, the participating terminal 20*b* which has sent the authentication image is not registered in the authenticated terminal information 185*a*, so the correlation determining unit 136 sets the representative face ID to none. This record is a second record of the correlation information 195*a* illustrated in FIG. 22.

In procedure (2), the acquisition unit 131 of the authentication control unit 130 of the authentication unit 100 acquires the authentication image shot by the participating terminal 20*b*. The extracting unit 132 extracts a face b" of the user b from the acquired authentication image, as illustrated in FIG. 19.

The matching unit 133 matches the image of the face b" extracted from the authentication image with the face images recorded in the authentication information 175*a*, and determines whether an image of the same face is registered in the authentication information 175*a*. Here, determination is made that the extracted face b" is the same face as the face b and face b' of which the face images are registered in the authentication information 175*a*.

The registration unit 134 registers the image of the face b" in the face image (#03) of the record of face ID "$F_b$" in the authentication information 175*a*. The terminal registration unit 135 has determined by way of the matching unit 133 that the face b" is the face of the face ID "$F_b$", and that the face extracted from the authentication image is only the face b", so determination is made that authentication of the participating terminal 20*b* which has sent the authentication image has been successful. The terminal registration unit 135 generates a record in the authenticated terminal information 185*a* of the group ID "$G_1$" correlating the terminal ID "$T_b$" of the participating terminal 20*b* with the face ID "$F_b$". This record is a first record of the authenticated terminal information 185*a* in FIG. 21. The number of faces extracted from the authentication image is one, so the correlation determining unit 136 does not perform addition of data to the correlation information 195*a*.

In procedure (3), the acquisition unit 131 of the authentication control unit 130 of the authentication unit 100 acquires the authentication image shot with the participating terminal 20*c*. As illustrated in FIG. 19, a face c' of the user c and a face d of the user d are extracted from the acquired authentication image by the extracting unit 132.

The matching unit 133 matches the image of the face c' and the image of the face d extracted from the authentication image with the face images recorded in the authentication information 175*a*, and determines whether the same face images are registered in the authentication information 175*a*. Here, determination is made that the extracted face c' is the same face as the face c of which the face image is registered in the authentication information 175*a*. However, no image determined to be the same face as the extracted face d has been registered in the authentication information 175*a*.

The registration unit 134 registers the image of the face c' in the face image (#02) of the record of face ID "$F_c$" in the authentication information 175*a*. Also, the registration unit 134 newly issues a face ID "$F_d$" to the face d of the user d, and registers the image of the face d in a face image (#01) of a record of face ID "$F_d$" in the authentication information 175*a*. Thus, the face c' determined to be a face the same as the face c of which information is registered in the authentication information 175*a*, and the face d determined to be a face of which information is not registered in the authentication information 175*a*, are included in faces extracted from the authentication image. At this time, the registration unit 134 registers, in the authentication information 175*a*, the image of the face d determined to be a face of which information is not registered in the authentication information 175*a*, as a user face image to be newly permitted to participate in the group of the group ID "$G_1$".

Of the faces extracted from the authentication image, the only face regarding which determination is made as being the same face as a face of which information has been registered in the authentication information 175*a* is the face c', so the terminal registration unit 135 determines that authentication of the participating terminal 20*c* which has sent the authentication information has been successful. The terminal registration unit 135 generates a record correlating the terminal ID "$T_c$" of the participating terminal 20*c* with the face ID "$F_c$" in the authenticated terminal information 185*a* of the group ID "$G_1$". This record is a second record of the authenticated terminal information 185*a* illustrated in FIG. 21. Unlike the case of procedure (1), with procedure (3) the face regarding which determination has been made as having information registered in the authentication information 175*a* is just the face c', and there is no participating terminal 20 registered so as to be correlated with that face ID "$F_c$", so registration of the authenticated terminal information 185*a* to the participating terminal 20*c* is performed.

Since multiple faces have been extracted from the authentication image, the correlation determining unit 136 adds a record to the correlation information 195*a* of the group ID "$G_1$" in which the face ID "$F_c$" corresponding to the face c' and the face ID "$F_d$" corresponding to the face d are registered in a correlated manner. At this time, the terminal ID "$T_c$" of the participating terminal 20*c* which has sent the authentication image is correlated with the face ID "$F_c$", so the correlation determining unit 136 registers the face ID "$F_c$" as the representative face ID. This record is a third record of the correlation information 195*a* illustrated in FIG. 22.

In procedures (4), the acquisition unit 131 of the authentication control unit 130 of the authentication unit 100 acquires the authentication image shot by the participating terminal 20*a*. The extracting unit 132 extracts a face a" of the user a from the acquired authentication image, as illustrated in FIG. 19.

The matching unit 133 matches the image of the face a" extracted from the authentication image with the face images recorded in the authentication information 175*a*, and determines whether an image of the same face is registered in the authentication information 175*a*. Here, determination is made that the extracted face a" is the same face as the face a and face a' of which the face images are registered in the authentication information 175*a*.

The registration unit 134 registers the image of the face a" in the face image (#03) of the record of face ID "$F_a$" in the authentication information 175*a*. The terminal registration unit 135 has determined by way of the matching unit 133 that the face a" is the face of the face ID "$F_a$", and that the face extracted from the authentication image is only the face a", so determination is made that authentication of the participating terminal 20*a* which has sent the authentication image has been successful. The terminal registration unit 135 generates a record in the authenticated terminal information 185*a* of the group ID "$G_1$" correlating the terminal ID "$T_a$" of the participating terminal 20*a* with the face ID "$F_a$". This record is a third record in the authenticated terminal information 185*a* in FIG. 21. The number of faces extracted from the authentication image is one, so the correlation determining unit 136 does not perform addition of data to the correlation information 195*a*.

In procedure (5), the acquisition unit 131 of the authentication control unit 130 of the authentication unit 100 acquires the authentication image shot by the participating terminal 20*d*. The extracting unit 132 extracts a face d' of the user d from the acquired authentication image, as illustrated in FIG. 19.

The matching unit 133 matches the image of the face d' extracted from the authentication image with the face images recorded in the authentication information 175*a*, and determines whether an image of the same face is registered in the authentication information 175*a*. Here, determination is made that the extracted face d' is the same face as the face d of which the face image is registered in the authentication information 175*a*.

The registration unit 134 registers the image of the face d' in the face image (#02) of the record of face ID "$F_d$" in the authentication information 175*a*. At this stage, the authentication information 175*a* of the group ID "$G_1$" is as illustrated in FIG. 20.

The terminal registration unit 135 has determined by way of the matching unit 133 that the face d' is a face of the face ID "$F_d$", and that the face extracted from the authentication image is only the face d', so determination is made that authentication of the participating terminal 20*d* which has sent the authentication image has been successful. The terminal registration unit 135 generates a record in the authenticated terminal information 185*a* of the group ID "$G_1$" correlating the terminal ID "$T_d$" of the participating terminal 20*d* with the face ID "$F_d$". This record is a fourth record of the authenticated terminal information 185*a* illustrated in FIG. 21. At this stage, the authenticated terminal information 185*a* of the group with the group ID "$G_1$" is as illustrated in FIG. 21.

The number of faces extracted from the authentication image is one, so the correlation determining unit 136 does not perform addition of data to the correlation information 195*a*. At this stage, the correlation information 195*a* of the group with the group ID "$G_1$" is as illustrated in FIG. 22.

Second Embodiment

Figure 23:
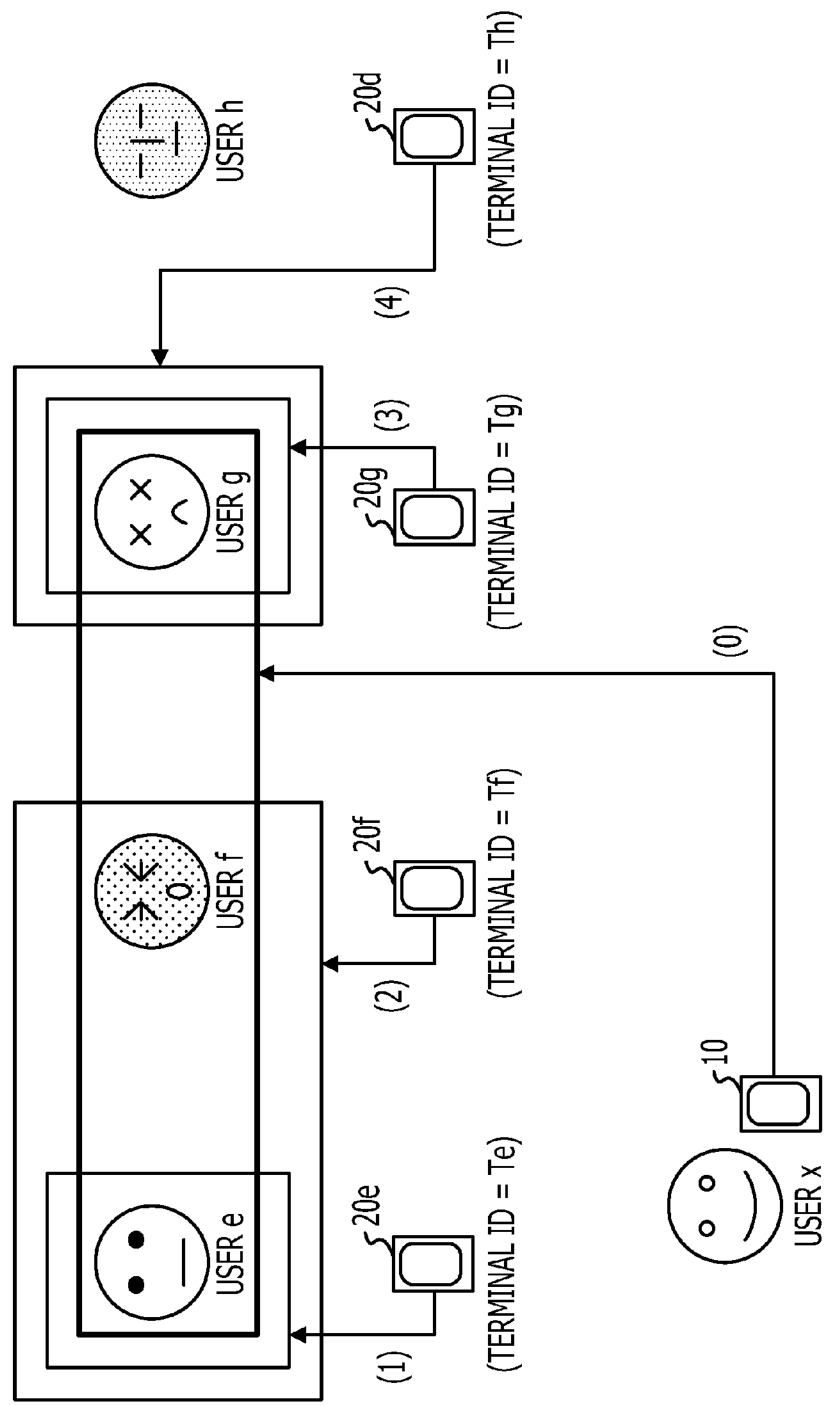
FIG. 23 illustrates shooting procedures of user faces according to a second embodiment.

FIG. 23 illustrates shooting procedures of faces of users according to a second embodiment.

In the second embodiment, we will say that shooting of the faces of users is performed according to the following procedures to create a new group. In FIG. 23, the numerals in parentheses indicate the order in which the user faces were shot. Now, we will say that a group ID "$G_2$" has been assigned to the group being newly created here.

(0) A user x operating the authentication terminal 10 shoots the faces of a user e, user f, and user g, with the camera 12 of the authentication terminal 10. The obtained images are subjected to processing at the authentication unit 100 of the authentication terminal 10 as they are, as initial registration images.

(1) The user e operating the participating terminal 20*e* shoots the face of the user e with the camera 22 of the participating terminal 20*e*. The obtained image is sent from the participating terminal 20*e* to the authentication terminal 10 as an authentication image. Let up say that the terminal ID of the participating terminal 20*e* is "$T_e$".

(2) The user f operating the participating terminal 20*f* shoots the face of the user e and user f with the camera 22 of the participating terminal 20*f*. The obtained image is sent from the participating terminal 20*f* to the authentication terminal 10 as an authentication image. Let up say that the terminal ID of the participating terminal 20*f* is "$T_f$".

(3) The user g operating the participating terminal 20*g* shoots the face of the user g with the camera 22 of the participating terminal 20*g*. The obtained image is sent from the participating terminal 20*g* to the authentication terminal 10 as an authentication image. Let up say that the terminal ID of the participating terminal 20*g* is "$T_g$".

(4) The user h operating the participating terminal 20*h* shoots the face of the user g with the camera 22 of the participating terminal 20*h*. The obtained image is sent from the participating terminal 20*h* to the authentication terminal 10 as an authentication image. Let up say that the terminal ID of the participating terminal 20*h* is "$T_h$".

With the second embodiment, only the image obtained by the shooting according to the first procedure (0) serves as a registration image, and the images obtained by the shooting according to procedure (1) through procedure (4) serve as authentication images. The images shot with the participating terminals 20 are sent to the authentication terminal 10, and processed at the authentication unit 100.

Figure 24:
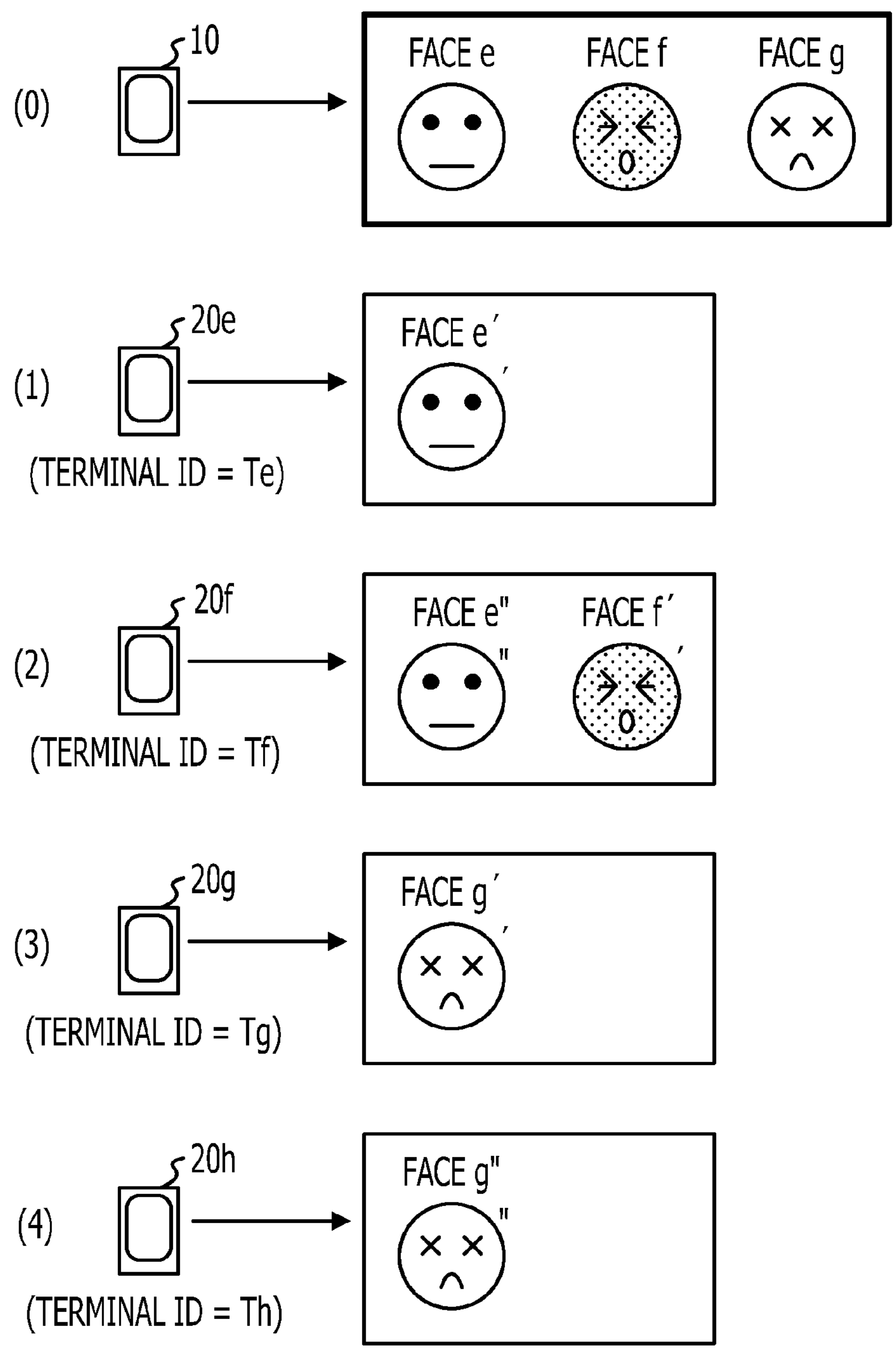
FIG. 24 is a diagram illustrating faces extracted from images obtained by procedures according to the second embodiment.

FIG. 24 is a diagram illustrating faces extracted from images obtained by the procedures according to the second embodiment.

FIG. 24 illustrates the relation between the shooting terminals in procedure (0) through procedure (4) according to the second embodiment, and the faces extracted from the images obtained by shooting.

FIG. 25 is a diagram illustrating an example of authentication information according to the second embodiment.

The authentication information 175*b* illustrated in FIG. 25 is an example of authentication information 175 of the group with the group ID "$G_2$" according to the second embodiment.

FIG. 26 is a diagram illustrating an example of authenticated terminal information according to the second embodiment.

The authenticated terminal information 185*b* illustrated in FIG. 26 is an example of the authenticated terminal information 185 of the group with the group ID "$G_2$" according to the second embodiment.

FIG. 27 is a diagram illustrating an example of correlation information according to the second embodiment.

The correlation information 195*b* illustrated in FIG. 27 is an example of the correlation information 195 of the group with the group ID "$G_2$" according to the second embodiment.

Description will be made regarding the flow of the series of processing by the authentication unit 100 from the new group with the group ID "$G_2$" being created up to processing for shooting in procedure (4) according to the second embodiment, with reference to FIGS. 24 through 27.

In procedure (0), the registration image acquisition unit 121 of the registration control unit 120 in the authentication unit 100 acquires the registration image shot by the authentication terminal 10. The face extracting unit 122 extracts the face e of the user e, the face f of the user f, and the face g of the user g, from the acquired registration image, as illustrated in FIG. 24. The face registration unit 123 issues e face ID to the face of each user. Here, a face ID "$F_e$" is issued to the face e of the user e, a face ID "$F_f$" to the face f of the user f, and a face ID "$F_g$" to the face g of the user g.

The face registration unit 123 registers images of the faces of each user extracted by the registration image acquisition unit 121 in the authentication information 175*b* of the group ID "$G_2$", correlated with the face IDs issued thereto. At this time, with the authentication information 175*b*, an image of the face e of the user e is registered in a face image (#01) of a record of face ID "$F_e$", an image of the face f of the user f in a face image (#01) of a record of face ID "$F_f$", and an image of the face g of the user g is registered in a face image (#01) of a record of face ID "$F_g$".

Also, the face registration unit 123 registers the face IDs "$F_e$", "$F_f$", and "$F_g$" of the faces extracted from the registration image in the record of the representative face ID "0" in the correlation information 195*b* of the group ID "$G_2$". This is recording of the correlation of faces extracted from the recording image shot at the particular authentication terminal 10, so the correlation of these faces is recorded in the record of which the representative face ID in the correlation information 195*b* is "0". This record is a first record of the correlation information 195*b* illustrated in FIG. 27.

In procedure (1), the acquisition unit 131 of the authentication control unit 130 of the authentication unit 100 acquires the authentication image shot with the participating terminal 20*e*. As illustrated in FIG. 24, a face e' of the user e is extracted from the acquired authentication image by the extracting unit 132.

The matching unit 133 matches the image of the face e' extracted from the authentication image with the faces recorded in the authentication information 175*b*, and determines whether the same faces are registered in the authentication information 175*b*. Here, determination is made that the extracted face e' is the same face as the face e of which the face image is registered in the authentication information 175*b*.

The registration unit 134 registers the image of the face e' in the face image (#02) of the record of face ID "$F_e$" in the authentication information 175*b*. The matching unit 133 has determined by way of the terminal registration unit 135 that the face e' is the face of the face ID "$F_e$", and that the only face extracted from the authentication image is the face e', so determination is made that authentication of the participating terminal 20*e* which has sent the authentication image has been successful. The terminal registration unit 135 generates a record in the authenticated terminal information 185*b* of the group ID "$G_2$" correlating the terminal ID "$T_e$" of the participating terminal 20*e* with the face ID "$F_e$". This record is a first record of the authenticated terminal information 185*b* illustrated in FIG. 26. The number of faces extracted from the authentication image is one, so the correlation determining unit 136 does not perform addition of data to the correlation information 195*b*.

In procedure (2), the acquisition unit 131 of the authentication control unit 130 of the authentication unit 100 acquires the authentication image shot with the participating terminal 20*f*. As illustrated in FIG. 24, a face e" of the user e and a face f' of the user f are extracted from the acquired authentication image by the extracting unit 132.

The matching unit 133 matches the image of the face e" and the image of the face f' extracted from the authentication image with the face images recorded in the authentication information 175*b*, and determines whether the same face images are registered in the authentication information 175*b*. Here, determination is made that the extracted face e" is the same face as the faces e and e' of which the face images are registered in the authentication information 175*b*, and that the extracted face f' is the same face as the face f of which the face image is registered in the authentication information 175*b*.

The registration unit 134 registers the image of the face e" in the face image (#03) of the record of face ID "$F_e$" in the authentication information 175*b*. The registration unit 134 also registers the image of the face f in the face image (#02) of the record of face ID "$F_f$" in the authentication information 175*b*.

Of the face e" and face f' extracted from the authentication image, the participating terminal 20*e* and the face ID "$F_e$" have already been correlated in procedure (1) regarding the face e" of which determination has been made as being a face of face ID "$F_e$". However, no participating terminal 20 and the face ID "$F_f$" have been correlated regarding the face f' of which determination has been made as being a face of face ID "$F_f$". Of the faces extracted from the authentication image, there is a face which is the same face as a face of this an image is registered in the authentication information 175, and just the face f' is not correlated with a participating terminal 20 yet, so determination is made by the terminal registration unit 135 that authentication of the participating terminal 20*f* which has sent the authentication image has succeeded. The terminal registration unit 135 generates a record in the authenticated terminal information 185*b* of group ID "$G_2$" in which the terminal ID "$T_f$" of the participating terminal 20*f* and the face ID "$F_f$" are correlated. This record is a second record of the authenticated terminal information 185*b* illustrated in FIG. 26.

Note that in the event that multiple faces are extracted from an authentication image, there is the possibility that participating terminals 20 and faces may not be suitably correlated, so an arrangement may be made wherein correlation between the participating terminals 20 and faces is not performed.

Since multiple faces have been extracted from the authentication image, the correlation determining unit 136 adds a record to the correlation information 195*b* of the group ID "$G_2$" in which the face ID "$F_e$" corresponding to the face e" and the face ID "$F_f$" corresponding to the face f are registered in a correlated manner. At this time, the terminal ID "$T_f$" of the participating terminal 20*f* which has sent the authentication image is correlated with the face ID "$F_f$" in the authenticated terminal information 185*b*, so the correlation determining unit 136 registers the face ID "$F_f$" as the representative face ID. This record is a second record of the correlation information 195*b* illustrated in FIG. 27.

In procedures (3), the acquisition unit 131 of the authentication control unit 130 of the authentication unit 100 acquires the authentication image shot by the participating terminal 20*g*. The extracting unit 132 extracts a face g' of the user g from the acquired authentication image, as illustrated in FIG. 24.

The matching unit 133 matches the image of the face g' extracted from the authentication image with the faces recorded in the authentication information 175*b*, and determines whether an image of the same face is registered in the authentication information 175*b*. Here, determination is made that the extracted face g' is the same face as the face g of which the image is registered in the authentication information 175*b*.

The registration unit 134 registers the image of the face g' in the face image (#02) of the record of face ID "$F_g$" in the authentication information 175*b*. The terminal registration unit 135 has determined by way of the matching unit 133 that the face g' is the face of the face ID "$F_g$", and that the face extracted from the authentication image is just the one face g', so determination is made that authentication of the participating terminal 20*g* which has sent the authentication image has been successful. The terminal registration unit 135 generates a record in the authenticated terminal information 185*b* of the group ID "$G_2$" correlating the terminal ID "$T_g$" of the participating terminal 20*a* with the face ID "$F_g$". This record is a third record in the authenticated terminal information 185*b* illustrated in FIG. 26. The number of faces extracted from the authentication image is one, so the correlation determining unit 136 does not perform addition of data to the correlation information 195*b*.

In procedure (4), the acquisition unit 131 of the authentication control unit 130 of the authentication unit 100 acquires the authentication image shot by the participating terminal 20*h*. The extracting unit 132 extracts a face g" of the user g from the acquired authentication image, as illustrated in FIG. 24.

The matching unit 133 matches the image of the face g" extracted from the authentication image with the face images recorded in the authentication information 175*b*, and determines whether an image of the same face is registered in the authentication information 175*b*. Here, determination is made that the extracted face g" is the same face as the face g and face g' of which the face images are registered in the authentication information 175*b*.

The registration unit 134 registers the image of the face g" in the face image (#03) of the record of face ID "$F_g$" in the authentication information 175*g*. At this stage, the authentication information 175*b* of the group with the group ID "$G_2$" is as illustrated in FIG. 25.

The terminal registration unit 135 has determined by way of the matching unit 133 that the face g" is a face of the face ID "$F_g$", and that the only face extracted from the authentication image is the face g", so determination is made that authentication of the participating terminal 20*h* which has sent the authentication image has been successful. The terminal registration unit 135 generates a record in the authenticated terminal information 185*b* of the group ID "$G_2$" correlating the terminal ID "$T_h$" of the participating terminal 20*h* with the face ID "$F_g$". This record is a fourth record of the authenticated terminal information 185*b* illustrated in FIG. 26. At this stage, the authenticated terminal information 185*b* of the group ID "$G_2$" is as illustrated in FIG. 26.

The number of faces extracted from the authentication image is just the one face g", but the face ID "$F_g$" of that face g" is correlated with two terminal IDs "$T_g$" and "$T_h$" in the authenticated terminal information 185*b*, so the correlation determining unit 136 adds a record for registering the face ID "$F_g$" in the correlation information 195*b* of the group ID "$G_2$". At this time, the correlation determining unit 136 the representative face ID to none. This record is a third record of the correlation information 195*b* illustrated in FIG. 27. At this stage, the correlation information 195*b* of the group with the group ID "$G_2$" is as illustrated in FIG. 27.

With the embodiment, authenticating multiple participating terminals 20 with the same face is permitted, and multiple records with the same face ID and different terminal IDs are recorded in the authenticated terminal information 185*b* illustrated in FIG. 26 according to the second embodiment.

An arrangement may be made where multiple participating terminals 20 are not authenticated with the same face. For example, an arrangement may be made regarding the procedure (4) in the second embodiment such that the terminal registration unit 135 references the authenticated terminal information 185*b* and confirms that the face ID "$F_g$" has already been correlated with the terminal ID "$T_g$", and does not perform correlation between the terminal ID "$T_h$" and face ID "$F_g$". Alternatively, the number of participating terminals 20 which may be authenticated with the same face may be restricted to a predetermined number.

Also, in the event that multiple participating terminals 20 are registered with the same face as indicated in correlation information 195*b* in FIG. 27 of the second embodiment, the face IDs of the faces are registered in the correlation information 195 with the embodiment, but an arrangement may be made wherein these are not registered in the correlation information 195.

Also, an arrangement may be made wherein, in the event that a face has been already correlated with a participating terminal 20 in the authenticated terminal information 185 and another participating terminal 20 commissions authentication with the same face, data regarding the participating terminal 20 which was correlated first is deleted from the information. For example, an arrangement may be made wherein in procedure (4) in the second embodiment, the terminal registration unit 135 deletes the record recorded in authenticated terminal information 185*b* correlating the terminal ID "$T_g$" and face ID "$F_g$", and releases authentication of the participating terminal 20*g*.

The following is a description regarding group management using the correlation information 195 generated by the authentication unit 100 according to the embodiment.

Cases can be conceived regarding a group sharing information where there is information regarding which sharing is desired among a part of participating terminals 20 participating in the group, besides information shared among all participating terminals 20 participating in the group. In such a case, control becomes important such as setting a sub-group within the group and permitting access rights to a part of the information to only the participating terminals 20 belonging to the sub-group.

However, in the event of setting a sub-group in the authentication terminal 10 managing the group, there is a problem that this is a great burden on the user of the authentication terminal 10. Also, there can be conceived cases where a sub-group is set and then the settings of the sub-group have to be changed due to a participating terminal 20 being later added to the group, for example. Accordingly, there is demand for a technology whereby a sub-group can be easily created within a group sharing information.

FIG. 28A through 28D are diagrams describing an example of group management using correlation information according to the embodiment.

FIG. 28A illustrates an example of the correlation information 195. Here, we will say that the correlation information 195 illustrated in FIG. 28A has been generated in the process of the authentication information registration processing and authentication processing at the authentication unit 100. For example, the application 11 of the authentication terminal 10 acquires the correlation information 195 illustrated in FIG. 28A from the authentication unit 100, and performs group management using the acquired correlation information 195.

With the correlation information 195 illustrated in FIG. 28A, the first record of which the representative face ID is "0" indicates that a face of face ID "1" and a face of face ID "2" have been extracted from an authentication image shot with the camera 12 of the authentication terminal 10. The second record of which the representative face ID is "1" indicates that the face of face ID "1", a face of face ID "3", and a face of face ID "4" have been extracted from an authentication image shot with a participating terminal 20 correlated with the face ID "1". The fourth record of which the representative face ID is "2" indicates that the face of face ID "2" and a face of face ID "7" have been extracted from an authentication image shot with a participating terminal 20 correlated with the face ID "2".

In the following, several examples of group management using the correlation information 195 illustrated in FIG. 28A will be described with reference to FIGS. 28B through 28D. The numerals in circles in FIGS. 28B through 28D face IDs. The heavy lines surrounding the numerals in circles that indicate the face IDs indicate total groups and sub-groups. Note that optional group management using the correlation information 195 may be made other than the examples given here.

FIG. 28B illustrates a first group management example using the correlation information 195 illustrated in FIG. 28A. The first group management example illustrated in FIG. 28B is an example wherein, in addition to the total group including all face IDs "0" through "7", sub-groups are created for each record in the correlation information 195 with the representative face ID as the center.

From the first record in the correlation information 195 illustrated in FIG. 28A, a sub-group of face IDs "0", "1", and "2" is created. Also, from the second record in the correlation information 195 illustrated in FIG. 28A, a sub-group of face IDs "1", "3", and "4" is created. Also, from the third and fourth records in the correlation information 195 illustrated in FIG. 28A, a sub-group of face IDs "2", "5", "6", and "7" is created. Note that the third record group and the forth record group can each be handled as a different group.

FIG. 28C illustrates a second group management example using the correlation information 195 illustrated in FIG. 28A. The second group management example illustrated in FIG. 28C is an example wherein, in addition to the total group including all face IDs "0" through "7", sub-groups are created in accordance to distance in correlation from the face ID "0" corresponding to the authentication terminal 10.

Here, let us express the distance in correlation from the face ID "0" corresponding to the authentication terminal 10 in terms of generations. We will say that the face IDs directly correlated with the face ID "0" corresponding to the authentication terminal 10 as being first generation face IDs, and face IDs not directly correlated with the face ID "0" but rather related to the first generated face IDs as being second generation face IDs. Hereinafter, in the event of tracing correlation with the face ID "0" according to the closest distance, there more face IDs there are to the face ID "0", the greater the generation number becomes, such as third generation, fourth generation, and so forth.

For example, with the example of the correlation information 195 illustrated in FIG. 28A, the face IDs "1" and "2" correlated to the representative face ID "0" in the first record are the first generation face IDs. Also, the face IDs "3" and "4" correlated to the representative face ID "1" in the second record and the face IDs "5", "6", and "7" correlated to the representative face ID "2" in the third and fourth records are second generation face IDs. Accordingly, with the example illustrated in FIG. 28C, the face IDs "1" and "2" are first generation sub-groups. Also, the face IDs "3", "4", "5", "6", and "7" are second generation sub-groups.

FIG. 28D illustrates a third group management example using the correlation information 195 illustrated in FIG. 28A. The second group management example illustrated in FIG. 28D is an example wherein there is no total group including all face IDs "0" through "7", and just face IDs "0", "1", and "2" are handled as a group. Accordingly, the application 11 does not necessarily have to perform group management using all face IDs in the correlation information 195.

The application 11 which has acquired the correlation information 195 from the authentication unit 100 can generate optional sub-groups using the correlation information 195 as illustrated in the examples in FIGS. 28B through 28D, and perform access control in increments of the generated sub-groups.

Thus, with the embodiment, by the authentication unit 100 holding correlation among faces in the same image in the correlation information 195, optional sub-groups can be automatically generated in accordance with the application 11 using the correlation information 195. The users of the of the authentication terminal 10 and the users of the participating terminals 20 can set sub-groups within a group simply by shooting faces of users to set a sub-group together, and sending the image thereof to the authentication unit 100.

While the embodiment has been described above, it is needless to mention that various modifications can be made without departing from the spirit and scope thereof.

For example, with the embodiment, the authentication terminal 10 which provides information has an authentication unit 100 which performs the processing of facial recognition, but an arrangement may be made where all or part of the functions of the authentication unit 100 are relegated to the authentication terminal 10 and a server connected to the network 30.

Figure 29:
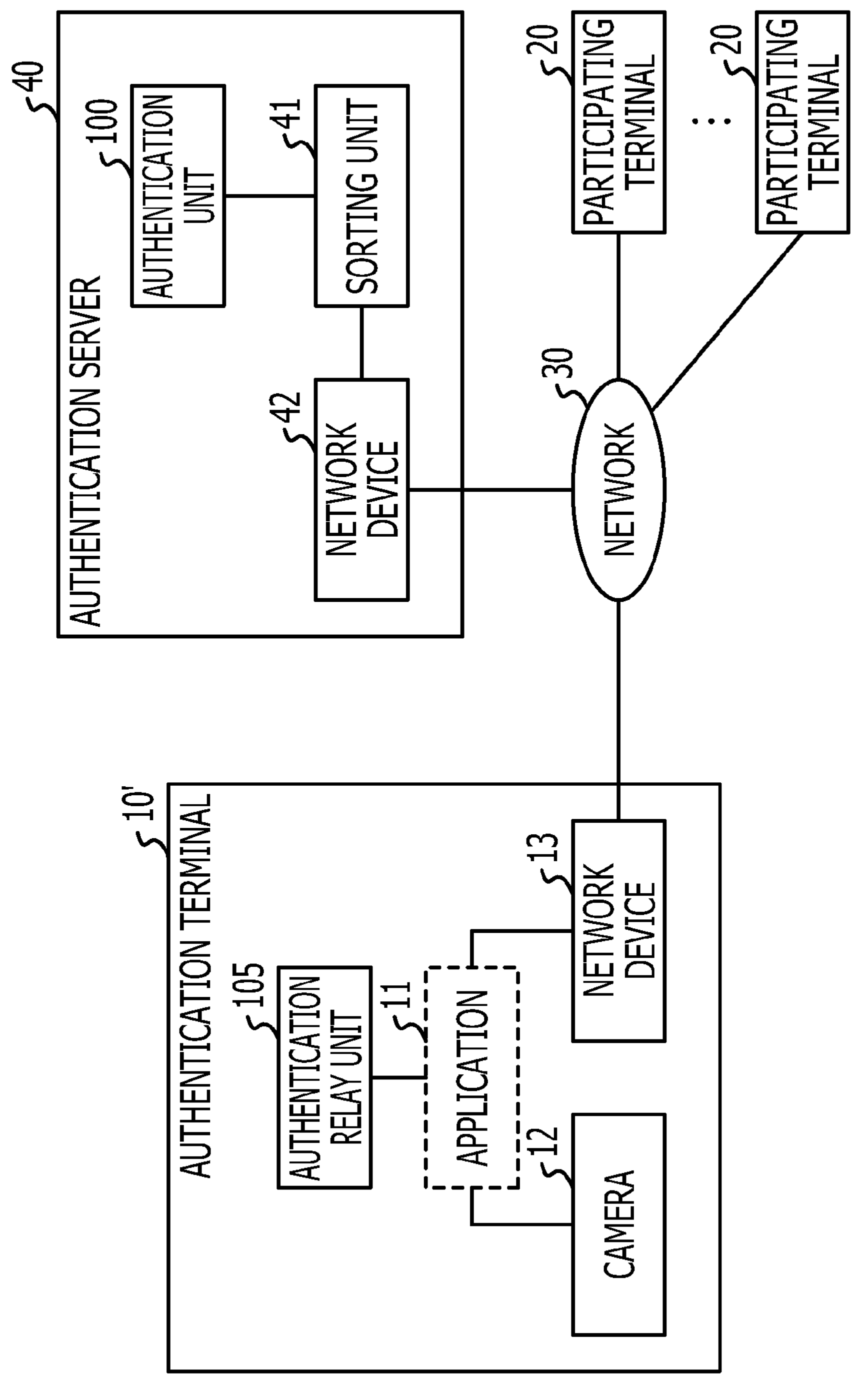
FIG. 29 is a diagram illustrating an example of a computer system where an authentication server has been given all functions of the authentication unit according to the embodiment.

FIG. 29 is a diagram illustrating a computer system where all of the functions of the authentication unit according to the embodiment have been relegated to an authentication server.

With the computer system illustrated in FIG. 29, the participating terminals 20 and network 30 are the same as with the computer system illustrated in FIG. 1.

An authentication terminal 10' includes an application 11, camera 12, network device 13, and authentication relay unit 105. In comparison with the authentication terminal 10 illustrated in FIG. 1, the authentication terminal 10' is of a configuration having the authentication relay unit 105 instead of the authentication unit 100. The application 11, camera 12, and network device 13 are the same as with those had by the authentication terminal 10 in FIG. 1. Note that the application 11 of the authentication terminal 10' performs various types of commissioning as to the authentication unit 100 via the authentication relay unit 105. The authentication relay unit 105 relays the various types of commissioning from the application 11 to the authentication unit 100 through an authentication server 40.

The authentication server 40 is an information processing device which performs processing relating to facial recognition according to the embodiment. The authentication server 40 has an authentication unit 100, a sorting unit 41, and a network device 42. The authentication unit 100 is the same as the authentication unit 100 of the authentication terminal 10 illustrated in FIG. 1. The network device 42 is a device which performs communication with external information processing devices. The sorting unit 41 determines types of commissioning as to the authentication unit 100, and performs suitable call-up of various function units which the authentication unit 100 has.

Figure 30:
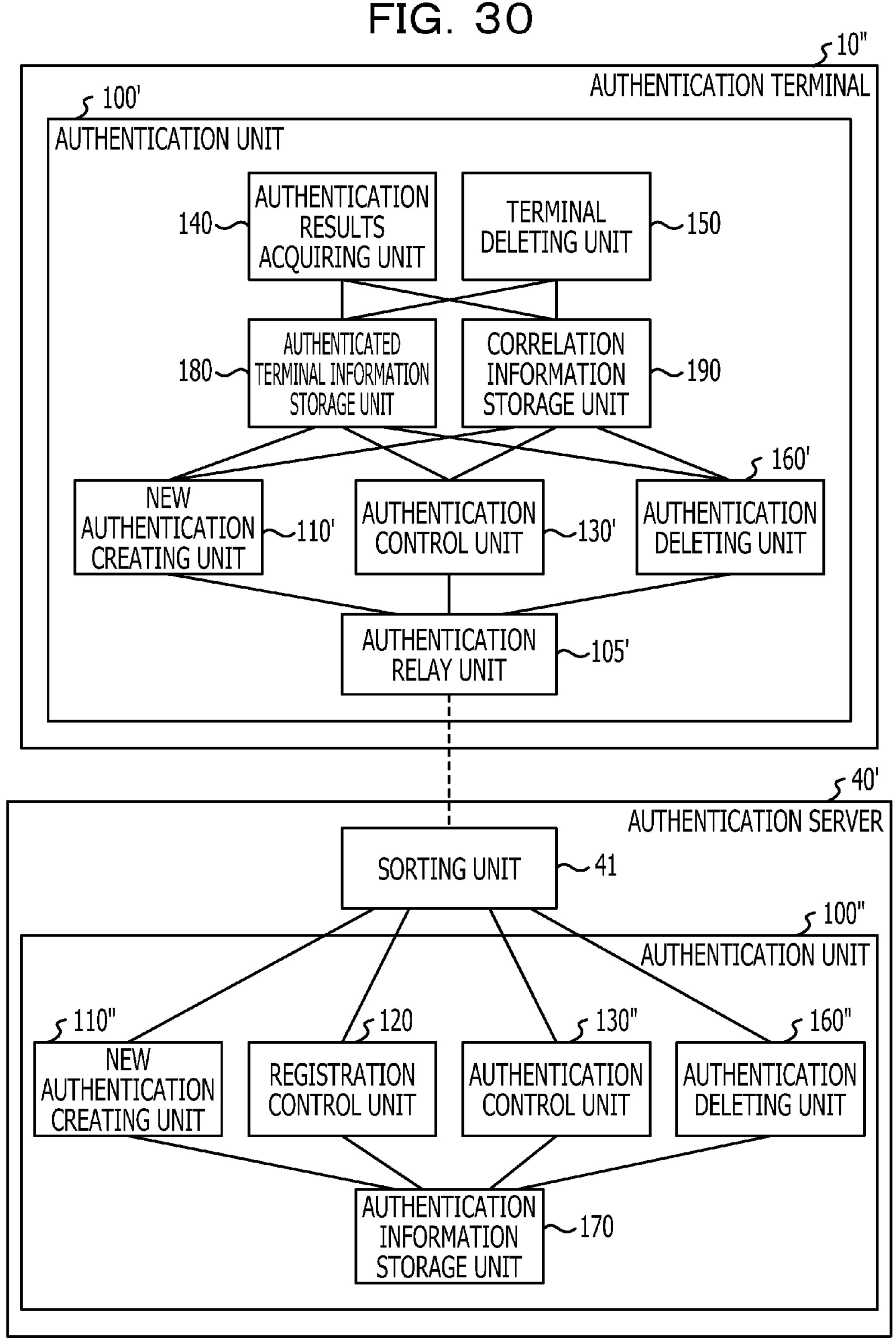
FIG. 30 is a diagram illustrating an example of a computer system where an authentication server has been given part of the functions of the authentication unit according to the embodiment.

FIG. 30 is a diagram illustrating an example of a computer system where part of the function of the authentication unit according to the embodiment has been relegated to an authentication server.

FIG. 30 illustrates only a portion of an authentication terminal 10" and a portion of an authentication server 40', with illustration of the participating terminal 20, network 30, and so forth, being omitted.

For example, in the event that the authentication terminal 10 is a small information processing device such as a cellular phone terminal or the like, heavy processing such as processing of extracting faces from images, processing of matching face information, and so forth, are a great burden. With the computer system illustrated in FIG. 30, of the functions of the authentication unit 100 illustrated in FIG. 2, relatively heavy processing functions such as functions of extracting faces from images, functions of matching face information, and so forth, have been relegated to the authentication server 40'.

The authentication unit 100' at the authentication terminal 10" side includes an authentication relay unit 105', new authentication creating unit 110', authentication control unit 130', authentication results acquiring unit 140, terminal deleting unit 150, authentication deleting unit 160', authenticated terminal information storage unit 180, and correlation information storage unit 190. Also, the authentication unit 100" at the authentication server 40' side includes an new authentication creating unit 110", registration control unit 120, authentication control unit 130", and authentication deleting unit 160". Note that the sorting unit 41 of the authentication server 40' distinguishes the type of commission as to the authentication unit 100" in the same way as with that illustrated in FIG. 29, so as to perform suitable call-up of the functions of the authentication unit 100".

The authentication results acquiring unit 140, terminal deleting unit 150, authenticated terminal information storage unit 180, and correlation information storage unit 190 at the authentication unit 100' at the authentication terminal 10" side, and the registration control unit 120 and authentication information storage unit 170 at the authentication unit 100" at the authentication server 40' side, are the same as with those illustrated in FIG. 2.

At the authentication unit 100' at the authentication terminal 10" side, the new authentication creating unit 110', authentication control unit 130', and authentication deleting unit 160' are the new authentication creating unit 110, authentication control unit 130, and authentication deleting unit 160 each illustrated in FIG. 2 but with functions relating to the authentication information 175 removed. Also, at the authentication unit 100" at the authentication server 40' side, the new authentication creating unit 110", authentication control unit 130", and authentication deleting unit 160" are the new authentication creating unit 110, authentication control unit 130, and authentication deleting unit 160 each illustrated in FIG. 2 but with functions relating to the authentication information 175 removed. The authentication relay unit 105' relays processing relating to the authentication information 175 occurring at the authentication unit 100' at the authentication terminal 10" side to the authentication unit 100" at the authentication server 40' side.

Note that the partial relegating of authentication functions to the authentication server 40' is not restricted to the arrangement illustrated in FIG. 30, and optional designs may be made.

Also, with regard to additional registration of face information as to the authentication information 175 according to the embodiment, conditions for the registration unit 134 to additionally register face information to the authentication information 175 may be further added.

For example, with the embodiment, the face images registered in the authentication information 175 include images of faces extracted from registration images shot by the camera 12 of the authentication terminal 10. As a condition for the registration unit 134 to additionally register face images to the authentication information 175, a condition may be added where faces, regarding which determination has been made that a face image has been extracted from a registration image and registered in the authentication information 175, are extracted from authentication images. With the embodiment, the authentication terminal 10 is a specific information processing device which a user holds who has special authority to directly decide users permitted to participate in the group sharing information. Also, faces extracted from a registration image are faces of particular users directly permitted by the user having the special authority to participate in the group sharing information. By making extracting of a face of a certain user which the user of the authentication terminal 10 has decided from an authentication image to be a condition, the range of users being authenticated can be kept to a range where the user of the authentication terminal 10 can trust.

Also, for example, with the embodiment, an authentication image is an image output from a participating terminal 20 commissioning authentication. As a condition for the registration unit 134 to additionally register face images to the authentication information 175, a condition may be added where the terminal ID of the participating terminal 20 commissioning authentication is recorded in the authenticated terminal information 185. Having the terminal ID recorded in the authenticated terminal information 185 means that authentication of that terminal ID has been successful. A participating terminal 20 which has succeeded in authentication is high in reliability. By making success in authentication by the participating terminal 20 commissioning the authentication to be a condition of additionally registering a face image in the authentication information 175, the participating terminals 20 registering face images to be used for external authentication can be restricted to highly reliable participating terminals 20.

Also, for example, as a condition for the registration unit 134 to additionally register face images to the authentication information 175, a condition may be added where the distance in correlation between a particular face extracted from a registration image and the face of which the face image is to be additionally registered is restricted. The distance in correlation from a particular face is represented in the correlation information 195 by the number of faces in between the particular face to the intended face by the shortest route. Thus, by restricting the distance in correlation from the particular face to the face to be registered, authentication of users having little correlation with the user of the authentication terminal 10 can be restricted.

Such additional conditions at the time of additionally registering face information to the authentication information 175 may be applied to the addition conditions at the time of recording information indicating correlation between faces in the correlation information 195. For example, an arrangement may be made where information indicating the correlation between faces extracted from authentication images is recorded in the correlation information 195 only in the event that a particular face is included in the authentication image. Also, an arrangement may be made where information indicating the correlation between faces extracted from authentication images is recorded in the correlation information 195 only in the event that the participating terminal 20 commissioning the authentication which has sent the authentication image has succeeded in authentication. Also, an arrangement may be made where information indicating the correlation between faces extracted from authentication images is recorded in the correlation information 195 only in the event that the distance of correlation from the particular face is within a predetermined range.

Such various variations in design may be made to hold the condition settings within the authentication unit 100, or conditions may be specified from the application 11. Also, the authentication unit 100 may query the application 11 for specification of conditions.

Also, with the embodiment, description has been made by way of an example where the authentication unit 100 is provided by a general-purpose module usable by multiple applications, but is not restricted to this example. For example, the authentication unit 100 may be included in a part of a particular application.

Also, while description has been made with the embodiment by way of an example where additional registration of face images to the authentication information 175 is executed by extracting faces from authentication images at the time of commissioning authentication from a participating terminal 20, but is not restricted to this example. For example, a design may be made where additional registration of face images to the authentication information 175 according to the embodiment is performed by processing as to images shot with the camera 22 of a participating terminal 20 other than commissioning authentication, such as commissioning additional registration of an authenticated user from a participating terminal 20. Similarly, optional design may be made regarding the trigger for executing registration as to the correlation information 195 for information indicating correlation between faces.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing an authentication program for causing a processor included in a first apparatus to execute an authentication process, the authentication process comprising:

extracting a plurality of face information from a first image acquired by the first apparatus;

when the plurality of face information include both first face information registered in authentication information and second face information not registered in the authentication information, registering the second face information in the authentication information, the authentication information being used for authenticating a second apparatus with which the first apparatus communicates;

receiving, by the first apparatus, a second image from the second apparatus with which a connection with the first apparatus is not established;

when third face information extracted from the second image from the second apparatus matches the second face information stored in the authentication information, transmitting, from the first apparatus to the second apparatus, a notice notifying that an authentication for the third face information is successful; and establishing the connection between the first apparatus and the second apparatus based on the notice.

2. The non-transitory computer-readable recording medium according to claim 1, the authentication process further comprising:

storing correlation information correlating the first face information and the second face information; and grouping a first user that is corresponding to the first face information and a second user that is corresponding to the second face information.

3. The non-transitory computer-readable recording medium according to claim 1, the authentication process further comprising:

storing a face identification information of the second face information and identification information of the second apparatus in authentication apparatus information, if the authentication is successful.

4. The non-transitory computer-readable recording medium according to claim 3, wherein the registering registers the second face information in authentication information, when another face identification information of the first face information and another apparatus identification information of the first apparatus are stored in the authentication apparatus information.

5. The non-transitory computer-readable recording medium according to claim 1, the authentication process further comprising:

extracting the first face information from a registration image that is taken by a camera belonging to an apparatus for taking the registration image; and storing the first face information in the authentication information, and wherein the first image is taken by another apparatus that is different from the apparatus for taking the registration image.

6. The non-transitory computer-readable recording medium according to claim 1, wherein the second image includes the third face information, and fourth face information which is not registered in the authentication information, and the authentication process further comprises:

extracting the fourth face information from the second image from the second apparatus; and when the third face information extracted from the second image from the second apparatus matches the second face information stored in the authentication information, registering the fourth face information in the authentication information.

7. An apparatus capable of being communicably coupled over a network to apparatuses, the apparatus comprising:

a memory that stores authentication information; and a processor that executes an authentication procedure of a first apparatus, the authentication procedure comprising:

extracting a plurality of face information from a first image acquired by the first apparatus, when the plurality of face information include both first face information registered in the authentication information and second face information not registered in the authentication information, registering the second face information in the authentication information, the authentication information being used for authenticating a second apparatus with which the first apparatus communicates, receiving a second image from the second apparatus with which a connection with the first apparatus is not established;

when third face information extracted from the second image from the second apparatus matches the second face information stored in the authentication information, transmitting, from the first apparatus to the second apparatus, a notice notifying that an authentication for the third face information is successful; and establishing the connection between the first apparatus and the second apparatus based on the notice.

8. The apparatus according to claim 7, the procedure further comprising:

storing correlation information correlating the first face information and the second face information in the memory, and grouping a first user that is corresponding to the first face information and a second user that is corresponding to the second face information.

9. The apparatus according to claim 7, the procedure further comprising:

storing a face identification information of the second face information and identification information of the second apparatus in authentication apparatus information stored in the memory, if the authentication is successful.

10. The apparatus according to claim 9, wherein the registering registers the second face information in authentication information, when another face identification information of the first face information and another apparatus identification information of the first apparatus are stored in the authentication apparatus information.

11. The apparatus according to claim 7, the procedure further comprising:

extracting the first face information from a registration image that is taken by a camera belonging to an apparatus for taking the registration image, and storing the first face information in the authentication information, and wherein the first image is taken by another apparatus that is different from the apparatus for taking the registration image.

12. The apparatus according to claim 7, wherein the second image includes the third face information, and fourth face information which is not registered in the authentication information, and the authentication procedure further comprises:

extracting the fourth face information from the second image from the second apparatus; and when the third face information extracted from the second image from the second apparatus matches the second face information stored in the authentication information, registering the fourth face information in the authentication information.

13. An authentication method executed by a first computer capable of being communicably coupled over a network to other computers, the authentication method comprising:

extracting a plurality of face information from a first image acquired by the first computer;

when the plurality of face information include both first face information registered in authentication information and second face information not registered in the authentication information, registering the second face information in the authentication information, the authentication information being used for authenticating a second computer with which the first computer communicates;

receiving, by the first computer, a second image from the second computer with which a connection with the first computer is not established;

when third face information extracted from the second image from the second computer matches the second face information stored in the authentication information, transmitting, from the first computer to the second computer, a notice notifying that an authentication for the third face information is successful; and establishing the connection between the first computer and the second computer based on the notice.

14. The authentication method according to claim 13 further comprising:

storing correlation information correlating the first face information and the second face information; and grouping a first user that is corresponding to the first face information and a second user that is corresponding to the second face information.

15. The authentication method according to claim 13 further comprising:

storing a face identification information of the second face information and identification information of the second computer in authentication computer information, if the authentication is successful.

16. The authentication method according to claim 15, wherein the registering registers the second face information in authentication information, when another face identification information of the first face information and another computer identification information of the first computer are stored in the authentication computer information.

17. The authentication method according to claim 13 further comprising:

extracting the first face information from a registration image that is taken by a camera belonging to a computer for taking the registration image; and storing the first face information in the authentication information, and wherein the first image is taken by another computer that is different from the computer for taking the registration image.

18. The authentication method according to claim 13, wherein the second image includes the third face information, and fourth face information which is not registered in the authentication information, and the authentication method further comprises:

extracting the fourth face information from the second image from the second computer; and when the third face information extracted from the second image from the second computer matches the second face information stored in the authentication information, registering the fourth face information in the authentication information.

* * * * *